(12) United States Patent
Park et al.

(10) Patent No.: US 8,737,376 B2
(45) Date of Patent: May 27, 2014

(54) FRONTEND MODULE FOR TIME DIVISION DUPLEX (TDD) CARRIER AGGREGATION

(75) Inventors: Chester Park, San Jose, CA (US); Jung-Fu Cheng, Fremont, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 167 days.

(21) Appl. No.: 13/303,985

(22) Filed: Nov. 23, 2011

(65) Prior Publication Data

US 2013/0039229 A1 Feb. 14, 2013

Related U.S. Application Data

(60) Provisional application No. 61/522,775, filed on Aug. 12, 2011.

(51) Int. Cl.
*H04J 1/00* (2006.01)

(52) U.S. Cl.
USPC .......................................... 370/343; 370/329

(58) Field of Classification Search
USPC ................. 370/328, 252, 349, 329, 335, 343; 375/260
See application file for complete search history.

(56) References Cited

U.S. PATENT DOCUMENTS 5,987,304 A * 11/1999 Latt ................................ 455/17
2008/0198776 A1 8/2008 Seo

FOREIGN PATENT DOCUMENTS

| JP | 2005-26784 A | 9/2005 |
| KR | 2007 0013173 A | 1/2007 |

* cited by examiner

*Primary Examiner* — Chandrahas Patel

(57) ABSTRACT

A frontend module for Time Division Duplex (TDD) with Carrier Aggregation (CA), wherein the frontend module reuses the band selection filters for the aggregated bands and provides switched connections to antenna and transmitter/receiver according to the Uplink (UL)/Downlink (DL) configuration. The use of switches on both the antenna side and the transmitter/receiver side of the frontend module enables the reuse of the band selection filters. The frontend module according to the present invention reduces the number of required filters to only one filter for each TDD-CA Component Carrier (CC) band. Thus, the frontend module avoids unnecessary band selection filters, and thereby also controls the cost of implementation of frontend modules in wireless units operating in the TDD-CA mode.

10 Claims, 16 Drawing Sheets

FIG. 10B
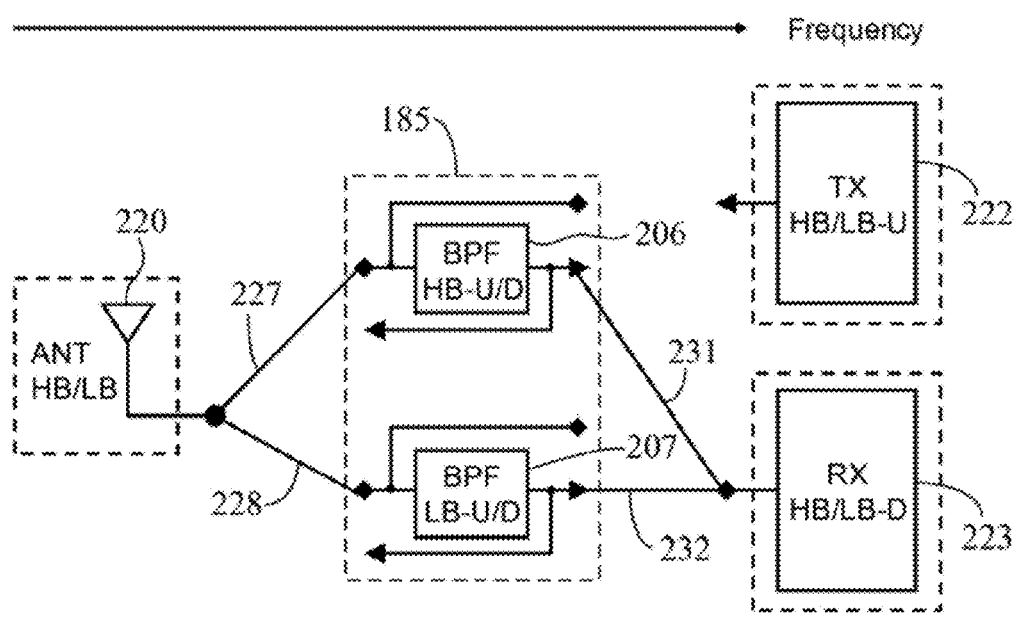
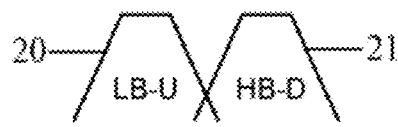
FIG. 10C
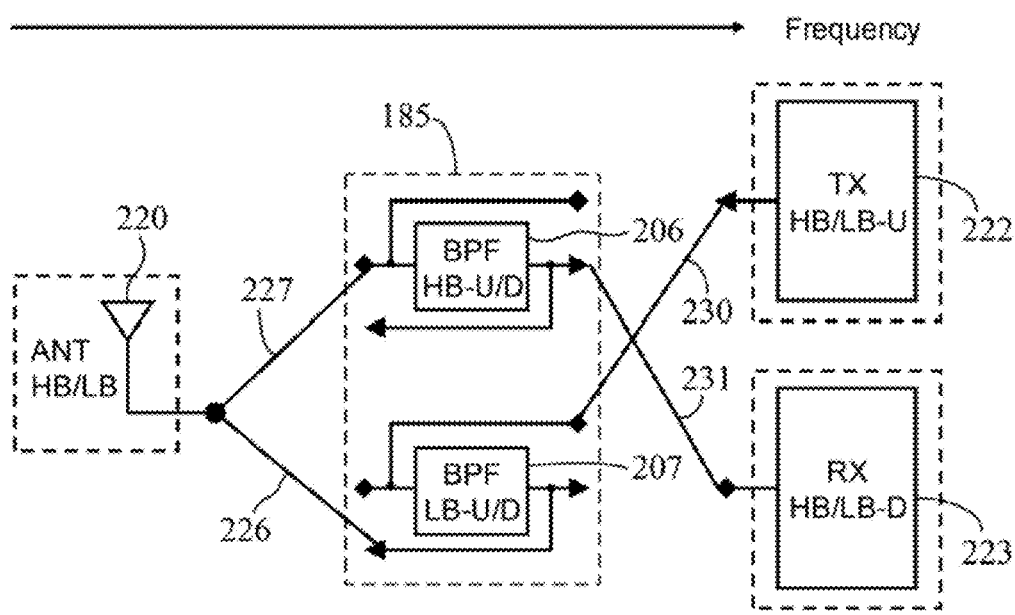

FRONTEND MODULE FOR TIME DIVISION DUPLEX (TDD) CARRIER AGGREGATION

CROSS-REFERENCE TO RELATED APPLICATIONS

This application claims the priority benefit under 35, U.S.C. §119(e) of U.S. Provisional Application No. 61/522,775, filed Aug. 12, 2011,, the disclosure of which is incorporated herein by reference in its entirety.

STATEMENT REGARDING FEDERALLY SPONSORED RESEARCH OR DEVELOPMENT: NOT APPLICABLE

REFERENCE TO SEQUENCE LISTING, A TABLE, OR A COMPUTER PROGRAM LISTING COMPACT DISC APPENDIX: NOT APPLICABLE

BACKGROUND

The present invention relates to frontend modules for filtering transmitted and received signals in a wireless network according to operational frequency bands. More particularly, and not by way of limitation, the present invention is directed to a frontend module for Time Division Duplex (TDD) with Carrier Aggregation (CA), wherein the frontend module reuses the band selection filters for the aggregated bands and provides switched connections to antenna and transmitter/receiver according to the Uplink (UL)/Downlink (DL) configuration.

With ever-increasing demand for wireless communication and broadband services, there is an ongoing evolution of Third Generation (3G) and Fourth Generation (4G) cellular networks like High Speed Packet Access (HSPA), Evolution-Data Optimized (EV-DO), Long Term Evolution (LTE), Worldwide Interoperability for Microwave Access (WiMAX), International Mobile Telecommunications-Advanced (IMT-Advanced) (e.g., LTE Advanced), etc., to support ever-increasing performance with regard to capacity, peak bit rates and coverage. Operators deploying these networks are continuously facing the need to provide radio channel resources that can accommodate more "traffic." In case of a mobile communication environment, such as Third Generation Partnership Project's (3GPP) LTE network, the Evolved Universal Terrestrial Radio Access (EUTRA) or Evolved Universal Terrestrial Radio Access Network (E-UTRAN) air interface for LTE may support wireless broadband data service at a rate of up to 300, Mbps in the downlink (DL) and 75 Mbps in the uplink (UL).

The LTE Release-10, ("Rel-10") standard has recently been standardized, supporting bandwidths larger than 20, MHz. One important requirement in LTE Rel-10, is to assure backward compatibility with LTE Rel-8. This also includes spectrum compatibility, which would imply that an LTE Rel-10, carrier, wider than 20, MHz, should appear as a discrete number of LTE carriers to an LTE Rel-8, terminal. Each such carrier can be referred to as a Component Carrier (CC). In particular, for early LTE Rel-10, deployments, it can be expected that there will be a smaller number of LTE Rel-10-capable terminals compared to many LTE legacy terminals (i.e., Rel-8, terminals). Therefore, it is necessary to assure an efficient use of a wide carrier also for legacy terminals—i.e., it should be possible to implement component carriers in such a way that legacy terminals can be scheduled in all parts of the wideband LTE Rel-10, carrier. One straightforward way to obtain this is by means of Carrier Aggregation (CA). CA implies that an LTE Rel-10, terminal can receive multiple CCs, where each CC has, or at least the possibility to have, the same structure as a Rel-8, carrier.

It is understood that transmission and reception from a node (e.g., a base station) or a terminal (e.g., a mobile handset) in a cellular system, such as the LTE, can be multiplexed in the frequency domain or in the time domain (or combinations thereof). Frequency Division Duplex (FDD) implies that downlink (DL) and uplink (UL) transmissions (whether simultaneous or not) take place in different, sufficiently-separated, frequency bands. Time Division Duplex (TDD), on the other hand, implies that DL and UL transmissions take place in different, non-overlapping time slots. In TDD, the same (single) carrier frequency is possible for both UL and DL transmissions because these transmissions are separated in time domain. However, in FDD, there may be two different carrier frequencies—one for UL transmission and one for DL transmission. Thus, TDD can operate in an unpaired spectrum, whereas FDD may require a paired spectrum.

FIG. 1 illustrates an example of carrier aggregation with reference to exemplary spectrum allocations for FDD, TDD, FDD with Carrier Aggregation (FDD-CA), and TDD with Carrier Aggregation (TDD-CA). In FIG. 1, plots 10 and 11 depict exemplary UL and DL spectrum allocation, respectively, for FDD communication (without CA), and plot 12 depicts an exemplary frequency band that is common for both UL and DL for TDD communication (without CA). In FIG. 1, and also in all other figures discussed below, only two carriers (or CCs) are assumed for CA as can be seen from spectra 14-15, 17-18, and 20-21. However, it is noted here that the plots in FIG. 1 are just to provide examples of spectrum allocation in various LTE transmission schemes. As is understood, there may be more than two CCs aggregated for CA, and the teachings of the present invention (discussed below) may equally apply to any such number of carriers in a CA scheme. When CA is supported for two carriers, one carrier is on the higher band (HB) and the other carrier is on the lower band (LB)—as can be seen, for example, from the LB plots 14-15 versus HB plots 17-18 for FDD-CA (in which different frequency bands may be needed for UL and DL transmissions as mentioned earlier) and from the LB plot 20 versus the HB plot 21 for TDD-CA (in which the same LB or HB spectrum may be used for both UL and DL transmissions as mentioned earlier). In the discussion below, it is assumed for simplicity that, in the case of FDD, the uplink (UL) band is always lower than the downlink (DL) band for a CC—as can be seen from plots 14-15 and 17-18 in FIG. 1. However, again, the teachings of the present invention are not limited to any such specific placement of UL and DL frequency bands or specific bandwidth of a given carrier band.

It is observed here that modern Integrated Circuit (IC) technology helps reduce the cost of radio implementation. However, there are still many key radio components that cannot be integrated into ICs. Such limitation is seen as a bottleneck in further cost saving. In particular, the so-called "frontend module" (discussed in more detail below) placed between antenna and transmitter/receiver in a wireless communication unit becomes more costly because of its lack of integration into an IC, even when the Radio Frequency (RF) IC becomes relatively cheaper thanks to scaling down offered by Complementary Metal-Oxide Semiconductor (CMOS) technology. A frontend module typically consists of numerous filters and switches, which support the required band selection (e.g., before transmission to and after reception from an antenna) and isolation (between transmitter and receiver signals) for multimode and multiband radios.

As mentioned before, FDD allows simultaneous transmission and reception, which requires the frontend module to isolate the receiver from the transmitter, for example, against transmit leakage or receiver noise. The so-called "duplexer" plays such a role, which can be seen as a combination of two band selection filters, with one for the transmit band and the other for the receive band. Half-duplex FDD relaxes the design requirement of frontend module by prohibiting simultaneous transmission and reception on User Equipment (UE) side, thereby removing the need for a duplexer for UE. As mentioned earlier, TDD prohibits simultaneous transmission and reception (in both eNodeBs (or base stations) and UEs), and therefore it helps the cost saving of the radio hardware.

As briefly mentioned earlier, recently, cellular systems have introduced carrier aggregation (CA) that supports simultaneous transmission and reception of multiple carriers (also referred to as Component Carriers or CCs). These carriers or CCs may be either inter-band or intra-band, and also either contiguous or non-contiguous. CA poses more challenge to the design of a frontend module, because multiple aggregated carriers/CCs need to be isolated from each other in transmit and receive chains of a wireless unit. TDD with carrier aggregation (i.e., TDD-CA) may require several duplexers in both eNodeBs and UEs, especially when the UUDL subframe configuration is different among the aggregated carriers.

FIG. 2 shows a conventional frontend module 23 for FDD. The frontend module 23 consists of two band selection (or band pass) filters—filter 25 for UL (band 10) and filter 26 for DL (band 11). For ease of reference, in FIG. 2 and also in FIGS. 3-6 and 9-10, all relevant frequency band(s) (from the set of various frequency bands shown in FIG. 1) is/are shown along with the corresponding frontend module for that frequency band(s). For example, in FIG. 2, frequency bands 10-11 are shown, whereas in FIGS. 5A-5F bands 20-21 are shown, etc. However, in view of discussion of FIG. 1, no additional discussion of such frequency bands is provided with reference to FIG. 2 or any of the other figures from FIGS. 3-6 and 9-10. Also for ease of reference, the following abbreviations are used in FIG. 2 and elsewhere in the discussion herein: "BPF" refers to "Band Pass Filter", "TX" refers to "transmitter", "RX" refers to "receiver", "ANT" refers to "antenna", "o/p" refers to "output", "i/p" refers to "input", and "U" and "D" refer to "uplink" and "downlink", respectively. In the context of a wireless communication unit, UL signals are considered to be "transmitted signals" whereas DL signals are considered to be "received signals." As mentioned earlier, the frontend module 23 may be placed between an antenna 27 and a transmitter-receiver pair (including the transmitter 28 and receiver 30) in the wireless unit (not shown). Thus, the UL filter 25 in the frontend module 23 may block the leakage of the noise from the transmitter 28 into the receiver 30, while the DL filter 26 may protect the receiver 30 from the transmit signal (which may be simultaneously sent to the UL filter 25 by the transmitter 28). Note that, throughout the discussion herein, the band selection filters or BPFs are assumed to operate in a unidirectional fashion, or, at least, they are assumed to have been optimized for filtering in a single direction. For instance, each band selection filter 25, 26 in FIG. 2 has two ports 32-33 and 35-36, respectively, and the filter design is assumed to be optimized in the direction from the port with a "diamond" mark (e.g., ports 32 and 35 in FIG. 2) to the other port with an "arrow" mark (e.g., ports 33 and 36 in FIG. 2). For ease of discussion, a "diamond" marked port may be referred to as an "input port" and a port with an arrow may be referred to as an "output port." The same convention may be valid for the transmitters and the receivers as well—i.e., transmitters with output ports (e.g., the transmitter 28 with an output port 38) and receivers with input ports (e.g., the receiver 30 with an input port 39). The antenna 27 is bi-directional in the sense that it can perform both transmissions and receptions and, hence, there may not be such uni-directional "ports" associated with the antenna 27 (or any other antenna discussed later below).

It is noted here that, unlike TDD, there is no switching needed for FDD between UL and DL signaling (because of dedicated/separate spectrum allocations for UL and DL) and, hence, the frontend module 23 is hardwired to the antenna 27, the transmitter 28, and the receiver 30. More specifically, the antenna 27 is hardwired into the input 35 of the DL filter 26 and the output 33 of the UL filter 25 as indicated by solid lines 41, 42, respectively. Similarly, the transmitter 28 is hardwired into the input 32 of the UL filter 25, while the receiver 30 is hardwired into the output 36 of the DL filter 26 as indicated by solid lines 43, 44, respectively. It is noted here that the solid lines 41-44 are for hardwiring-related illustration only; they do not represent actual hardwires. As indicated by the dotted box 23 in FIG. 2, a duplexer or frontend module for FDD is typically a 3-port device—one transmit port 32 for connection to the transmitter 28, one receive port 36 for connection to the receiver 30, and one antenna port for connection to the antenna 27. The antenna port may be considered a "combination" of ports 33 and 35 and may be collectively represented by junction point 45 indicating that the duplexer's 23 antenna side is hardwired into both the input of the DL filter and the output of the UL filter. As will be explained later in conjunction with FIGS. 5A-5F, it is possible to use this FDD duplexer (or frontend module) design to support TDD-CA.

It is pointed out here that because of detailed introduction through FIG. 2 and because of self-evident nature of input/output ports and various signaling connections in the drawings presented herein, every input port (marked with a diamond shape) or output port (marked with an arrow) and every hardwired or switching connection may not be labeled or specifically identified in every subsequent drawing to maintain clarity of figures and ease of discussion. It is understood that, if needed, such ports and connections in other figures may be easily identified like in FIG. 2.

FIGS. 3A-3C show the operations of a conventional frontend module for TDD. In case of TDD, the "frontend module" is nothing but a switch (which is not shown, but could be a simple transistor switch) connecting the antenna 48 with either the transmitter 50 or the receiver 51. The switch plays a role of isolating the receiver from the transmitter. In FIG. 3A, the switch connects the transmitter 50 to the antenna 48 to enable transmission of UL signals during the relevant subframe time. Such switched connection is illustrated by line 53 in FIG. 3A. In FIG. 3B, the switch connects the antenna 48 to the receiver 51 to enable reception of DL signals during the relevant subframe time. Such switched connection is illustrated by line 54 in FIG. 3B. FIG. 3C combines the switching individually illustrated in FIGS. 3A and 3B, and provides the overview (via dotted lines 53-54) of both switched connection possibilities of conventional frontend module for TDD. Of course, depending on the implementation choice, there may be some band selection filters in a TDD frontend module, but the specifications for such filters are usually far looser than those for conventional duplexers (e.g., FDD duplexers discussed above with reference to FIG. 2). Therefore, TDD helps the cost saving of radio implementation, since the filter, if any, is not required to satisfy a stringent filter specification.

FIGS. 4A and 4B show a conventional frontend module 56 for FDD-CA. As mentioned before, carrier aggregation with two CCs is assumed throughout the CA-related discussion herein. Therefore, the frontend module 56 for FDD-CA in FIG. 4A is shown to include two FDD duplexers 57-58. It is seen that two FDD duplexers 57-58—i.e., one duplexer for each carrier—support FDD-CA. The HB duplexer 57 consists of two band selection filters 59-60 for HB DL and HB UL and connects an HB antenna 62 to an HB transmitter 64 and an HB receiver 65. The LB duplexer 58 consists of two band selection filters 67-68 for LB DL and LB UL and connects an LB antenna 70 to an LB transmitter 72 and LB receiver 73. Thus, the FDD-CA frontend module 56 consists of four band selection filters: two filters 59-60 for HB and the other two filters 67-68 for LB. Similar to the case shown in FIG. 2, there is no switching needed for FDD-CA, and, hence, the frontend module 56 can be hardwired with corresponding antennas and transmitters/receivers as shown by solid lines (similar to those discussed with reference to FIG. 2, but not individually labeled for the sake of clarity as mentioned before) in FIG. 4A. The two UL filters 59, 68 block the noise of the corresponding transmitters 64, 72 from leaking into the corresponding receivers 65, 73; they also protect each other's signals from leaking into the other band. Likewise, the two DL filters 59, 67 protect their receivers 65, 73 from the transmit signals or each other's receive signals. The connection of the frontend module 56 with the antennas and transmitters/receivers in FIG. 4A can be seen as a simple extension of the connection shown in FIG. 2.

In FIG. 4A and other figures discussed later below, the transmitter/receiver blocks and antennas may be shown surrounded by dashed lines to indicate the components that can be optionally integrated into a single multiband component. FIG. 4B shows an example of such integration for the configuration of FIG. 4A. Thus, for example, the HB antenna 62 and the LB antenna 70 in FIG. 4A are shown to be replaced by a single multiband antenna 75 in FIG. 4B, depending on the implementation choice. Likewise, the band-specific transmitters 64, 72 in FIG. 4A and/or the band-specific receivers 65, 73 in FIG. 4A can be replaced by a multiband transmitter 77 and/or a multiband receiver 78, respectively. Except for the wideband antenna 75, wideband transmitter 77, and wideband receiver 78, all other components and hardwired connections are identical between FIGS. 4A and 4B as shown. Thus, configurations in FIGS. 4A and 4B remain functionally equivalent.

FIGS. 5A-5F illustrate how conventional FDD duplexer configurations can be used in a frontend module 80 for TDD-CA. In FIGS. 5A through 5D, different LB- and HB-based UL and DL signaling configurations (e.g., simultaneous UL transmissions on different CCs in different bands are indicated as LB-U and HB-U in case of FIG. 5A, simultaneous DL receptions on different CCs from different bands are indicated as LB-D and HB-D in case of FIG. 5B, etc.) and corresponding signaling connections (with respective transmitter/receiver) for the frontend module 80 are shown. Like FDD-CA, in the case of TDD-CA also there are multiple UUDL carriers and thus signal isolation is needed among the transmitters and the receivers. The required isolation can be achieved by using conventional FDD duplexer-type configurations 82-83 as shown in FIGS. 5A-5E. In case of FIGS. 5A-5E (and also in case of FIGS. 6A-6E discussed later), it is assumed that the frequency difference between the HB and the LB is so large that two band-specific antennas (e.g., antennas 85-86 in FIGS. 5A-5E) are needed in a mobile communication unit (not shown). It is noted here that an FDD duplexer (e.g., duplexer 23 in FIG. 2, or duplexers 57-58 in FIGS. 4A-4B) always has its two band pass filters hardwired on its antenna side. In case of FIGS. 5A-5E, the HB duplexer 82 consists of two identical band selection filters 88-89 for the HB and the LB duplexer 83 also consists of two identical band selection filters 90-91 for the LB. These BPFs 88-91 are shown hardwired (by using exemplary lines 93-96, which are labeled in FIGS. 5A and 5E only for the sake of clarity and to avoid undue repetition in other figures) to respective HB and LB antennas 85-86. It is noted here that, strictly speaking, these duplexer-type configurations 82-83 may be considered different from the conventional FDD duplexers in the sense that a conventional FDD duplexer consists of two different band selection filters (for two different bands—like bands 10-11 in FIG. 2, or HB bands 17-18 in FIGS. 4A-4B, etc.) isolating the receiver from the transmitter. On the other hand, each pair of BPFs 88-89 or 90-91 in FIGS. 5A-5E is for a single band—Either band HB-U/D 21 or band LB-U/D 20. In any event, the conventional FDD duplexers (with two different band selection filters) can be used, for example, when the HB and the LB are close enough to enable usage of a wideband antenna, as shown in FIG. 5F, which is discussed later below.

In FIGS. 5A-5D, two band-specific transmitters 98-99 and two band-specific receivers 102-103 are shown in different switched connections with relevant BPFs in the frontend module 80. Thus, on the transmitter/receiver side, the frontend module 80 may need appropriate switches (not shown) for the transmitters 98-99 and the receivers 102-103, according to the UL/DL configuration of the corresponding LTE subframe. Through different lines (e.g., lines 105-108) connecting appropriate BPFs, in the frontend module 80 with corresponding transmitter(s) and/or receiver(s), FIGS. 5A-5D illustrate examples of how to set the switches for different UL/DL configurations. It is noted here that lines 105 through 108 in FIGS. 5A-5D illustrate switched connections only—i.e., the lines are used merely to illustrate different signal switching arrangements in FIGS. 5A-5D and they do not depict any hardwired connections. Similar such lines are shown in FIGS. 6A-6D to illustrate different switched connections (this time between the antennas and the frontend module) as discussed later below. All individual switching possibilities shown in FIGS. 5A-5D are depicted combined in FIG. 5E, in which solid lines 93-96 are used to indicate hardwired connections (as between antennas 85-86 and the frontend module 80) and dashed lines 105-108 are used for various switched connections already shown in FIGS. 5A-5D.

As mentioned before, where the frequency difference between the HB and the LB is small enough, a designer may use wideband antennas and/or wideband transmitters/receivers instead of individual band-specific components for these entities. FIG. 5F exemplifies the use of a wideband antenna 110 (without any wideband transmitter or receiver) in conjunction with a frontend module 112. In this case, the frontend module 112 consists of two conventional FDD duplexers 113-114 that can support TDD-CA for all possible UUDL configurations. Each duplexer 113-114 includes a corresponding pair of HB and LB band-specific BPFs 116-117 and 119-120, respectively. Thus, contrary to duplexer-type configurations in FIGS. 5A-5F, each duplexer 113-114 in FIG. 5F has two truly different band selection filters like a conventional FDD duplexer as noted earlier. As in case of the frontend module 80 in FIGS. 5A-5E, the frontend module 112 has switches (not shown) on the transmitter/receiver side (as indicated by dashed lines 122-125 for such switched connections) and hardwired connections on the antenna side (as indicated by solid lines 127-130). The band-specific transmitters 98-99 and receivers 102-103 in FIG. 5F may be the same as those shown in FIGS. 5A-5E.

FIGS. 6A-6E depict another frontend module 133 for TDD-CA in which switches are introduced on the antenna side (as represented by lines 135-138 in FIGS. 6A-6D connecting appropriate BPFs with corresponding antennas 140-141) and the transmitter/receiver side is instead hardwired (as indicated by exemplary lines 143-146 connected to appropriate transmitters 148-149 and receivers 150-151 as shown). It is noted here that lines 143-146 are labeled in FIGS. 6A and 6E only for the sake of clarity and to avoid undue repetition in other figures. As before, relevant TDD-CA frequency bands 20-21 are shown at the top in each of the FIGS. 6A-6E for ease of reference. As mentioned before, it is reiterated here that lines 135 through 138 in FIGS. 6A-6D illustrate switched connections only—i.e., the lines are used merely to illustrate different signal switching arrangements in FIGS. 6A-6D and they do not depict any hardwired connections. All individual switching possibilities shown in FIGS. 6A-6D are depicted combined in FIG. 6E, in which solid lines 143-146 are used to indicate hardwired connections (as between the transmitter/receiver side and the frontend module 133) and dashed lines 135-138 are used for various switched connections already shown in FIGS. 6A-6D. As also mentioned earlier, the transmitter/receiver blocks and antennas are shown in FIGS. 6A-6E surrounded by dashed lines to indicate that these components can be optionally integrated into a single multiband (or wideband) component (e.g., when the spacing between the HB and LB is close enough) as shown, for example, in FIGS. 4B and 5F.

Similar to the frontend modules shown in FIGS. 5A-5F, the frontend module 133 in FIGS. 6A-6E also includes two duplexer-type filter units 153-154, each such filter unit includes two identical band selection filters for the corresponding band—one filter for the transmitter of the band and the other (identical) filter for the receiver of the band. For example, the filter unit 153 in FIGS. 6A-6E includes the BPF 156 for the receiver 150 of the HB band and the BPF 157 for the transmitter 148 of the HB band. Similarly, the filter unit 154 includes the BPF 159 for the receiver 151 of the LB band and the BPF 160 for the transmitter 149 of the LB band. However, the frontend module 133 in FIGS. 6A-6E may be considered different from the FDD duplexers shown in FIGS. 2, 4 and 5F in the sense that its BPFs are not hardwired on its antenna side, but are rather hardwired on its transmitter/receiver side as shown. It is observed here that the configurations in FIGS. 5 and 6 may be used interchangeably when switching for TDD-CA is desired.

SUMMARY

It is pointed out from the discussion above that the use of conventional FDD duplexers (e.g., in case of FIG. 5F) or FDD duplexer-type configurations (e.g., in case of FIGS. 5A-5E) as frontend modules for TDD-CA leads to two identical band selection filters in which only a single filter of a duplexer (or duplexer-type configuration) is used at a time and the other filter of the duplexer (or duplexer-type configuration) is not connected to any of the transmitters and receivers. In other words, because of time-based switching required for TDD communications, conventional configuration of frontend modules for TDD-CA results in an unnecessary band selection filter for every band-specific selection filter unit (whether an FDD duplexer or an FDD duplexer-type unit). This is the case regardless of whether switching is on transmitter/receiver side or is moved to the antenna side. More specifically, when switching is on the antenna side (FIGS. 6A-6D), the use of conventional FDD duplexers or FDD duplexer-type configurations as frontend modules for TDD-CA leads to two identical band selection filters in which only a single filter of a duplexer (or duplexer-type configuration) is used at a time and the other filter of the duplexer (or duplexer-type configuration) is not connected to any antennas. The presence of such unnecessary band selection filters implies costly implementation of the frontend modules for TDD-CA, especially when large number of carriers are aggregated or when multiple antenna units or transmit/receive chains (having their own chain-specific sets of frontend modules) operate in parallel in a wireless communication unit.

It is therefore desirable to devise a frontend module for TDD-CA that avoids unnecessary band selection filters, and thereby also controls the cost of implementation of frontend modules in wireless units operating in the TDD-CA mode.

The present invention provides a solution to the above-mentioned problem of unnecessary band selection filters in a frontend module for TDD-CA. According to one embodiment of the present invention, a frontend module is proposed that reuses the band selection filters and reduces the number of required filters to only one filter for each band (HB or LB). The use of switches on both the antenna side and the transmitter/receiver side of the frontend module enables the reuse of the band selection filters according to the UL/DL configuration of the present LTE subframe.

In one embodiment, the present invention is directed to a wireless communication unit operable in a wireless network in Time Division Duplex-Carrier Aggregation (TDD-CA) mode, wherein the wireless network supports TDD communication over a plurality of frequency bands aggregated for the CA. The wireless communication unit comprises: an antenna unit; a transceiver unit; and a frontend module to signal-wise link the antenna unit and the transceiver unit. The frontend module includes a plurality of frequency band-specific filters in which each band-specific filter contains only one band selection filter usable for both Uplink (UL) and Downlink (DL) signals over a corresponding frequency band from the plurality of frequency bands, and wherein each band-specific filter is in switched connection with the antenna unit and the transceiver unit.

In another embodiment, the present invention is directed to an improvement in a method of facilitating wireless communication in TDD-CA mode using a frontend module to signal-wise link an antenna unit and a transceiver unit operating in a wireless network that supports TDD communication over a plurality of frequency bands aggregated for the CA. The improvement comprises: configuring the frontend module to include a plurality of frequency band-specific filters in which each band-specific filter contains only one band selection filter usable for both uplink and downlink signals over a corresponding frequency band from the plurality of frequency bands, and wherein each band-specific filter is in switched connection with the antenna unit and the transceiver unit.

In a further embodiment, the present invention is directed to a method of facilitating wireless communication in TDD-CA mode in a wireless network, wherein the wireless network supports TDD communication over a plurality of frequency bands aggregated for the CA. The method comprises the steps of: (i) using a frontend module to signal-wise link an antenna unit and a transceiver unit, wherein the frontend module includes a plurality of frequency band-specific filters in which each band-specific filter contains only one band selection filter usable for both UL and DL signals over a corresponding frequency band from the plurality of frequency bands, and wherein each band-specific filter is in switched connection with the antenna unit and the transceiver unit; (ii) using the frontend module, providing UL signals from a transmitter in the transceiver unit to the antenna unit; and (iii)

using the frontend module, providing DL signals received by the antenna unit to a receiver in the transceiver unit.

In another embodiment, the present invention is directed to a system that comprises a mobile handset; and a mobile communication node that is in wireless communication with the mobile handset via a wireless network associated with the mobile handset. In the system, the wireless network supports TDD communication over a plurality of frequency bands aggregated for Carrier Aggregation (CA), wherein at least one of the mobile handset and the mobile communication node is operable in the wireless network in TDD-CA mode. In the system, at least one of the mobile handset and the mobile communication node includes the following: a corresponding antenna unit, a corresponding transceiver unit, and a corresponding frontend module to signal-wise link the antenna unit and the transceiver unit. The frontend module includes a plurality of frequency band-specific filters in which each band-specific filter contains only one band selection filter usable for both UL and DL signals over a respective frequency band from the plurality of frequency bands, and wherein each band-specific filter is in switched connection with the antenna unit and the transceiver unit.

The frontend module according to the present invention is simpler than the conventional one because it reuses the band selection filters for the aggregated bands and connects (switches) them to antenna and transmitter/receiver according to the UL/DL configuration. The proposed frontend module may be used in any LTE TDD device or unit supporting CA. The proposed frontend module also contributes to the cost saving of the radio implementation for TDD-CA, because it reuses the band selection filters via switching interface on both sides thereof.

BRIEF DESCRIPTION OF THE DRAWINGS

In the following section, the invention will be described with reference to exemplary embodiments illustrated in the figures, in which:

FIGS. 10A-10E show the frontend module of FIGS. 9A-9E used with a wideband antenna and a wideband transmitter/receiver;

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention. Additionally, it should be understood that although the invention is described primarily in the context of a cellular telephone/data network, the invention can be implemented in other forms of cellular or non-cellular wireless networks as well (for example, a corporate-wide wireless data network, a point-to-point wireless communication network such as a wireless walkie-talkie network, a satellite communication network, and the like).

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) in various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "pre-determined," "duplexer-type," etc.) may be occasionally interchangeably used with its non-hyphenated version (e.g., "predetermined," "duplexer type," etc.), a capitalized entry (e.g., "Uplink") may be interchangeably used with its non-capitalized version (e.g., "uplink"), and plural terms may be indicated with or without an apostrophe (e.g., UE's or UEs, CC's or CCs). Such occasional interchangeable uses shall not be considered inconsistent with each other.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing voice information or non-voice data/control information) to the second entity regardless of the type (analog or digital) of those signals. It is further noted that various figures (including component diagrams) shown and discussed herein are for illustrative purpose only, and are not drawn to scale.

Figure 1:
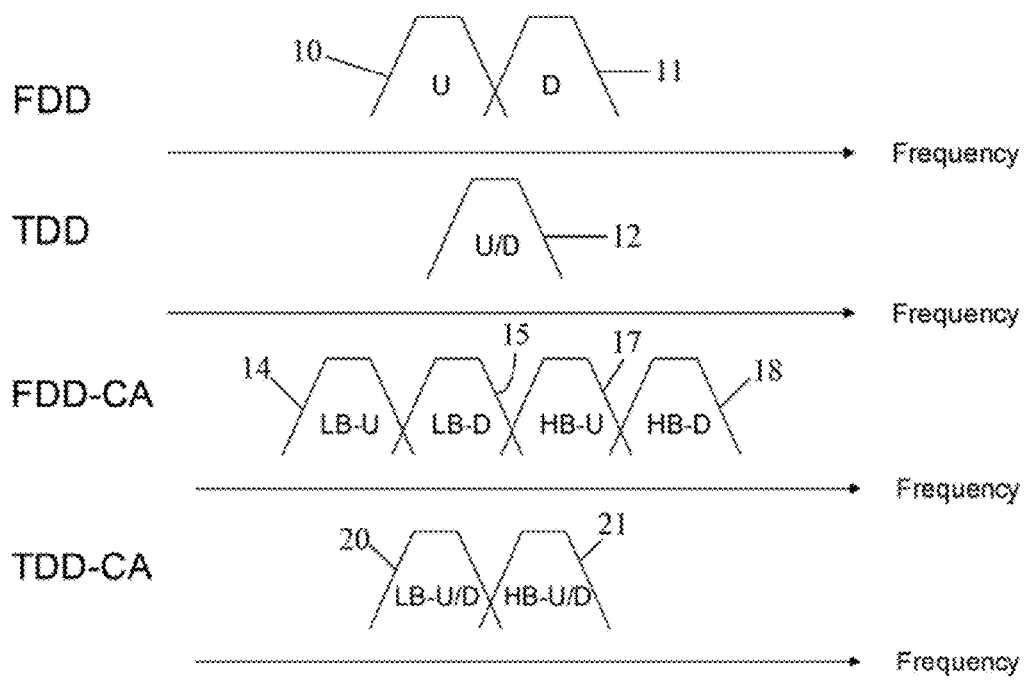
FIG. 1 illustrates an example of carrier aggregation with reference to exemplary spectrum allocations for FDD, TDD, FDD with Carrier Aggregation (FDD-CA), and TDD with Carrier Aggregation (TDD-CA)
Figure 2:
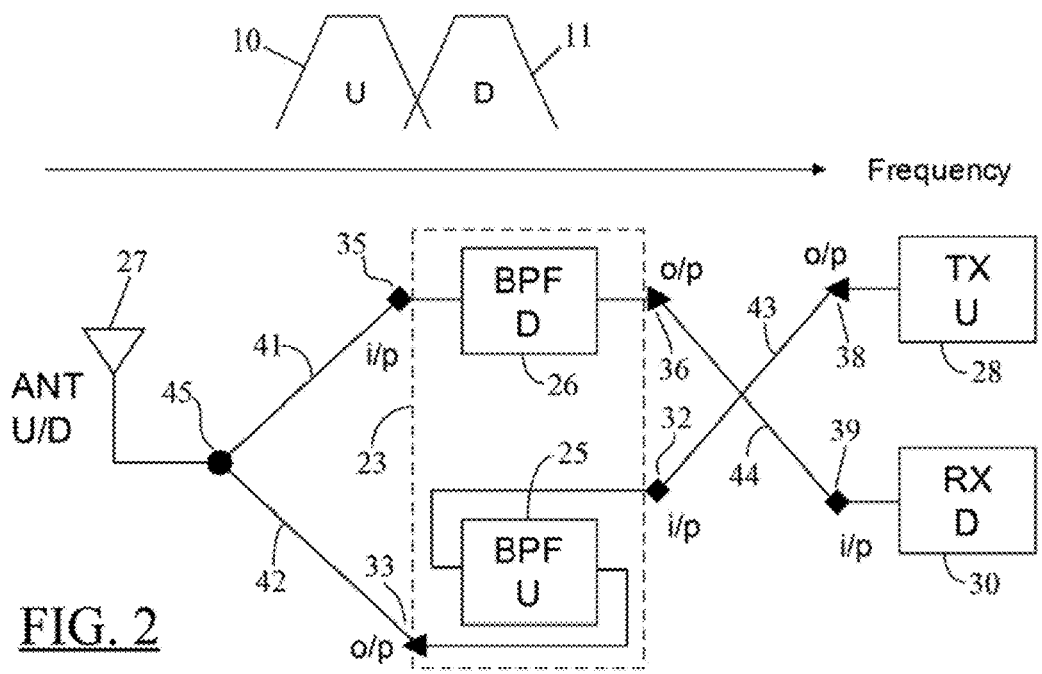
FIG. 2 shows a conventional frontend module for FDD.
Figure 3A:
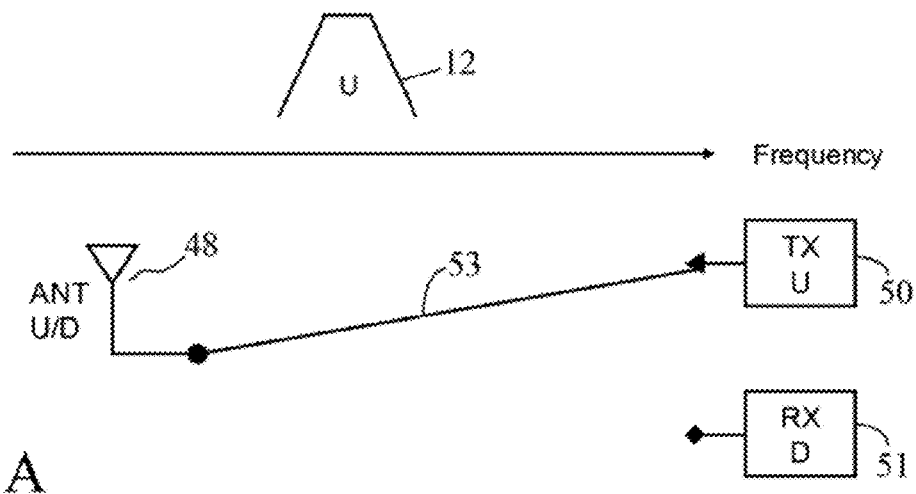
FIGS. 3A-3C show the operations of a conventional frontend module for TDD.
Figure 3B:
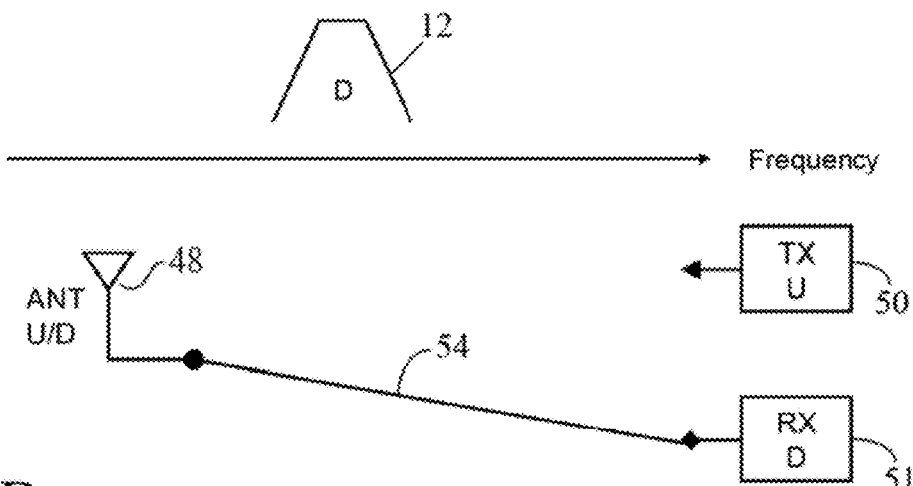
Figure 3C:
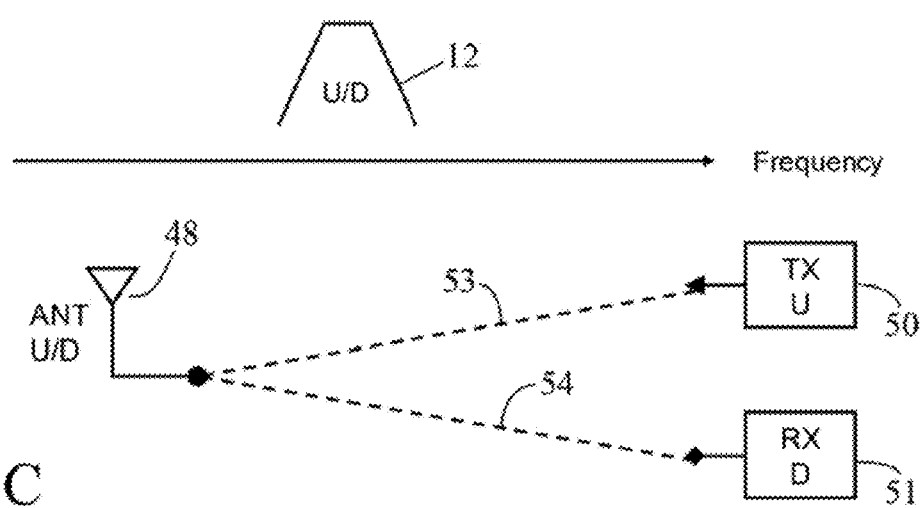
Figure 4A:
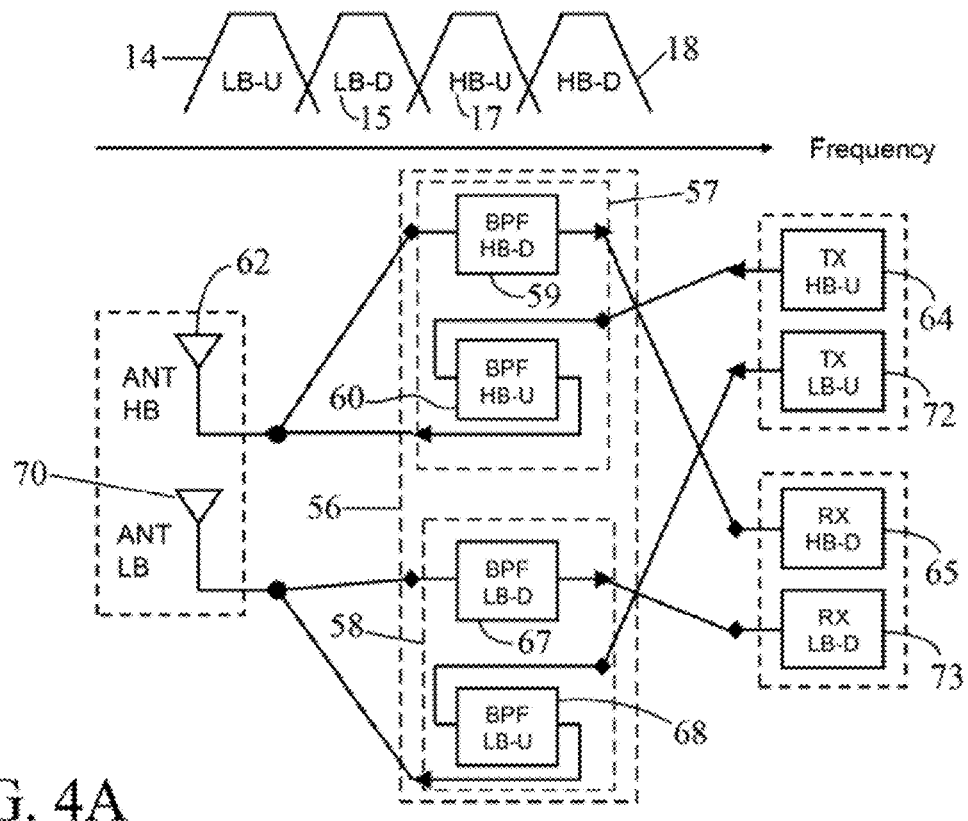
FIGS. 4A and 4B show a conventional frontend module for FDD-CA.
Figure 4B:
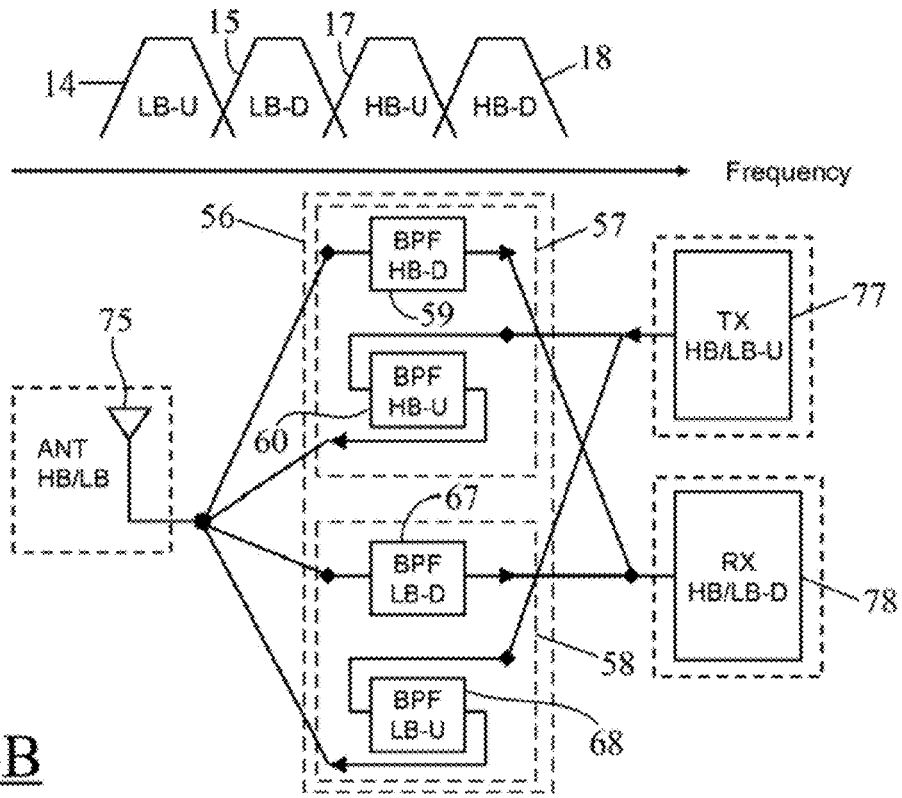
Figure 5A:
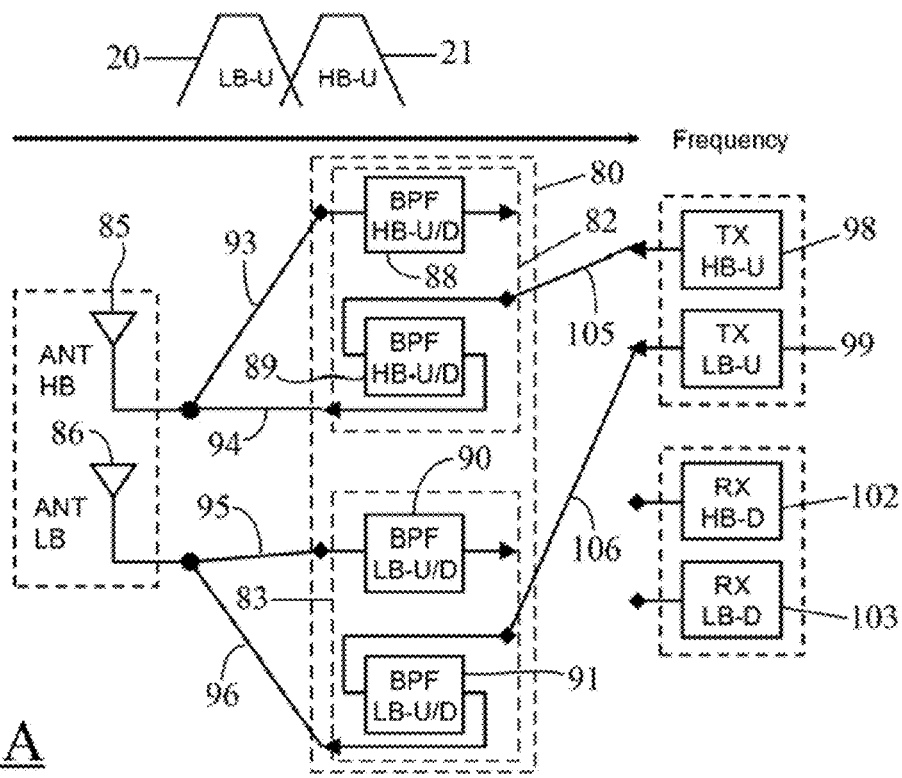
FIGS. 5A-5F illustrate how conventional FDD duplexer configurations can be used in a frontend module for TDD-CA.
Figure 5B:
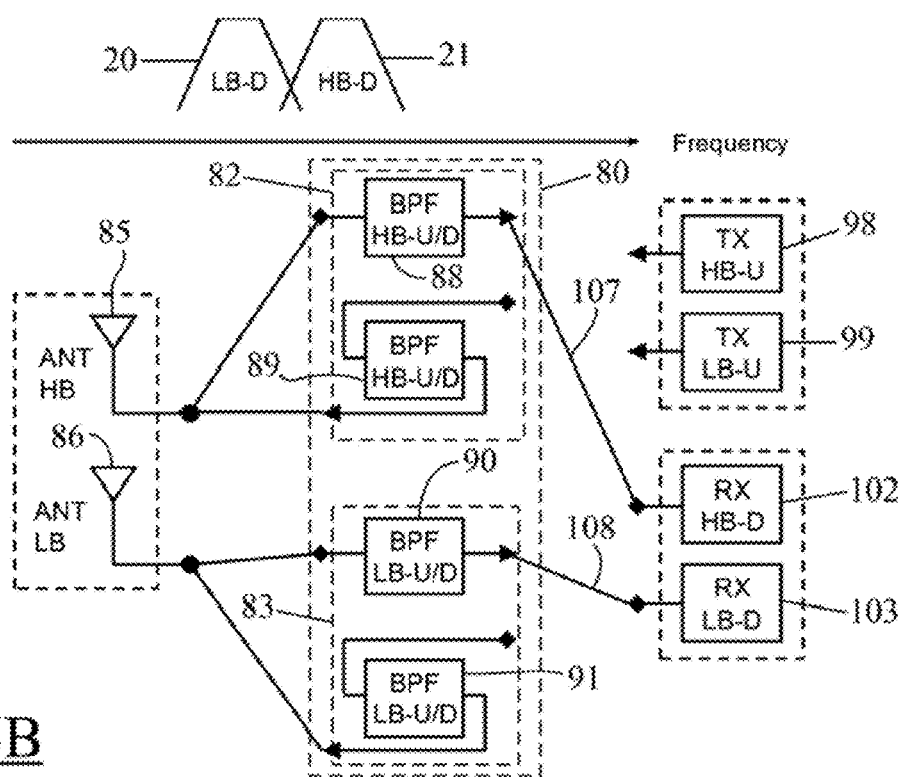
Figure 5C:
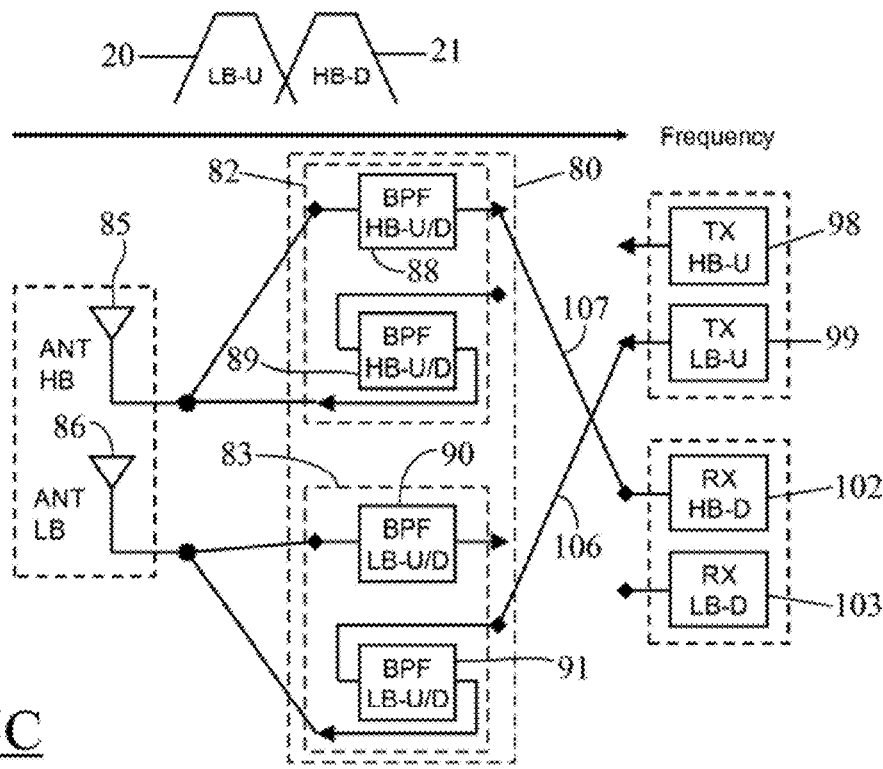
Figure 5D:
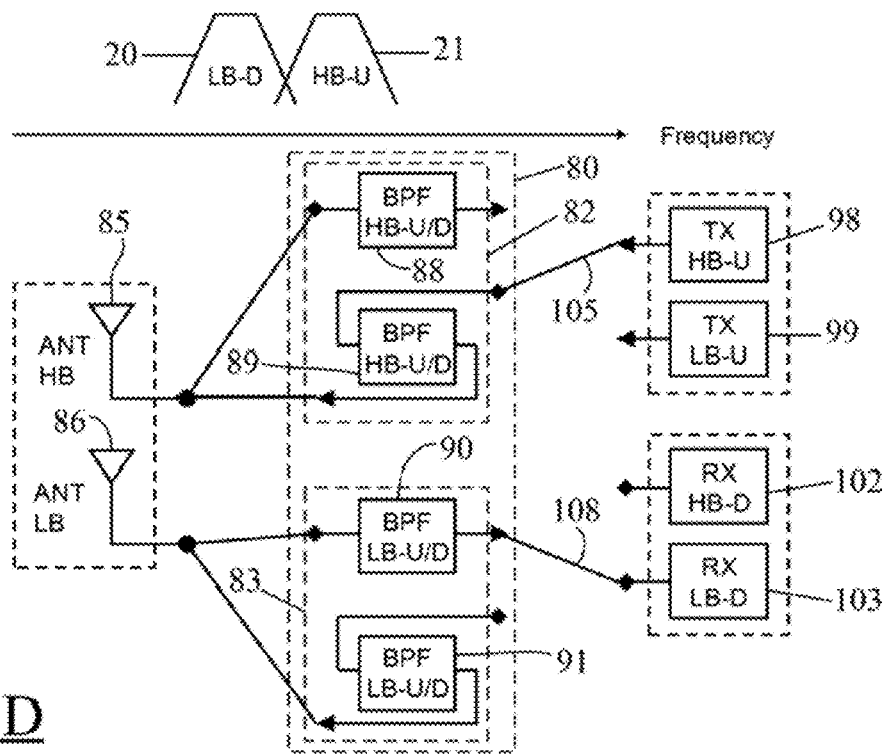
Figure 5E:
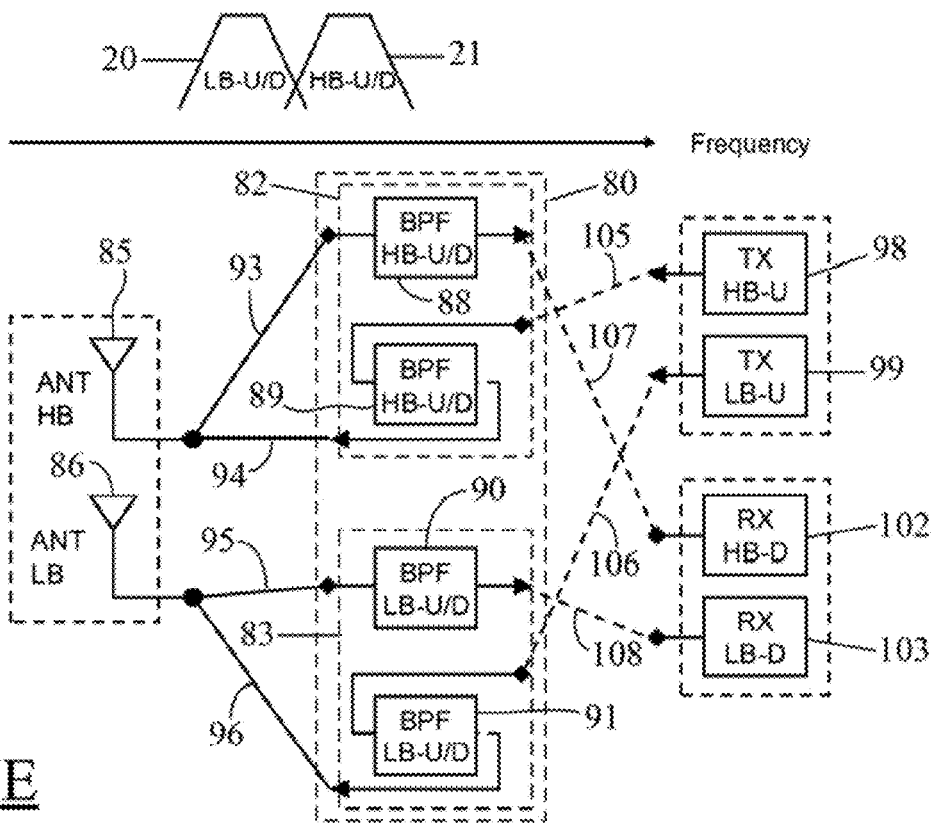
Figure 5F:
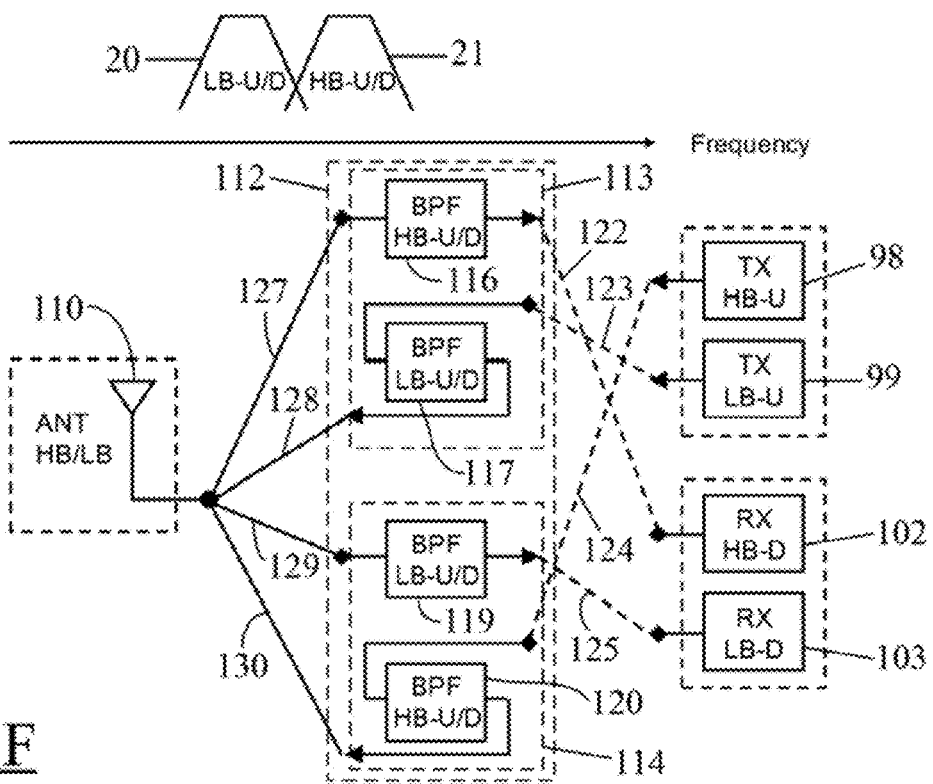
Figure 6A:
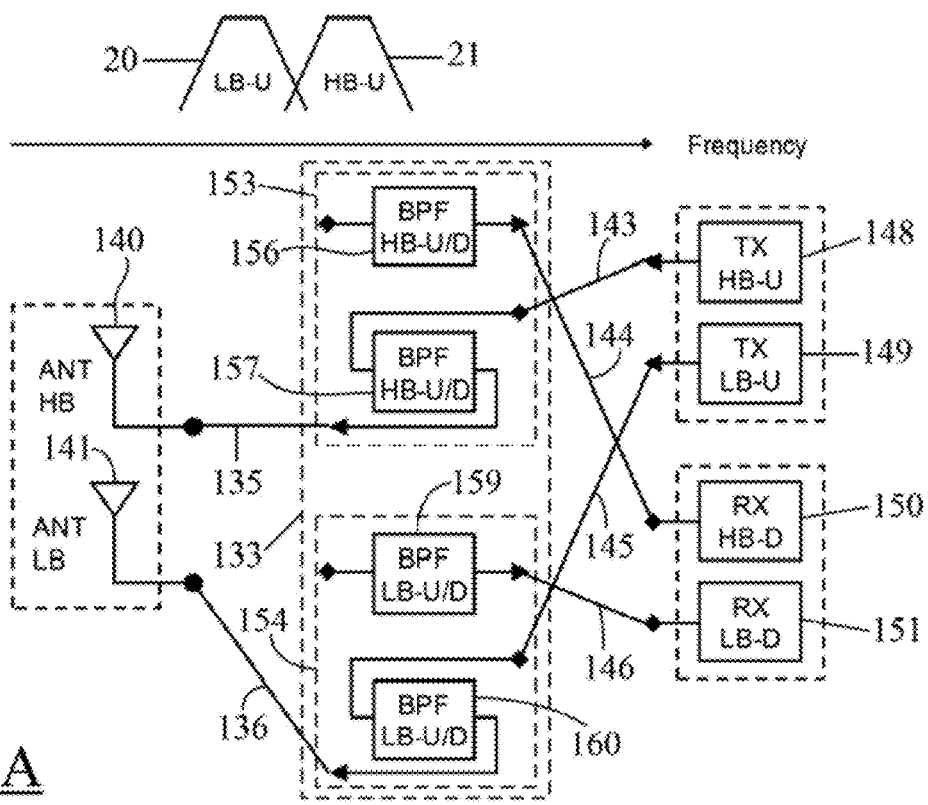
FIGS. 6A-6E depict another frontend module for TDD-CA in which switches are introduced on the antenna side and the transmitter/receiver side is instead hardwired.
Figure 6B:
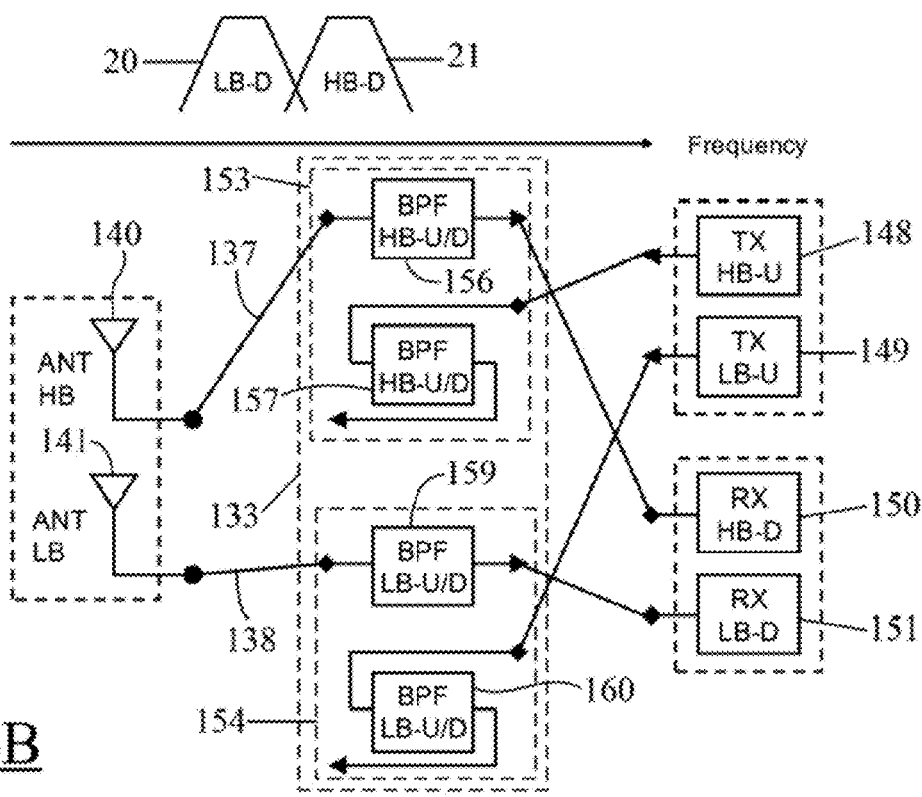
Figure 6C:
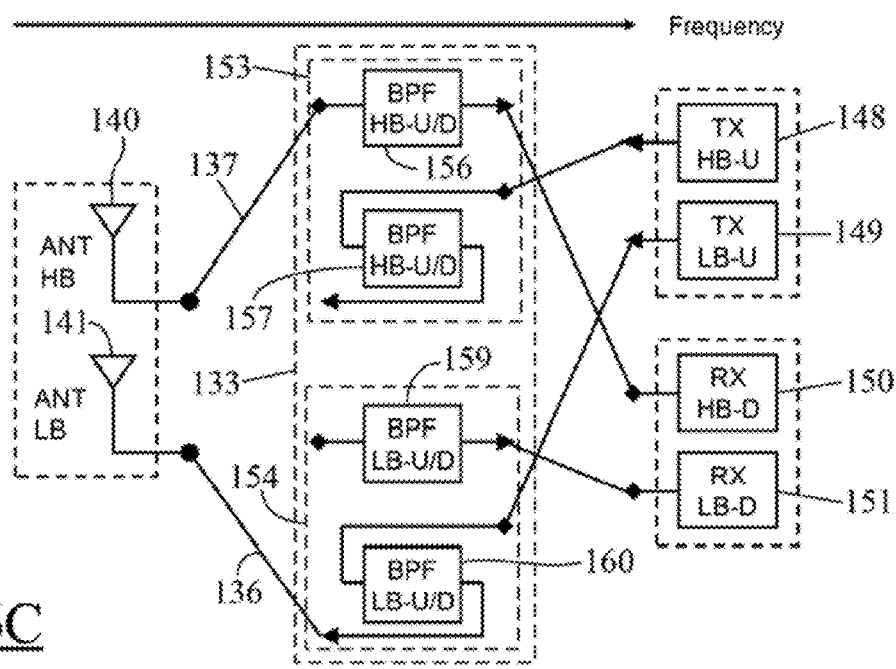
Figure 6D:
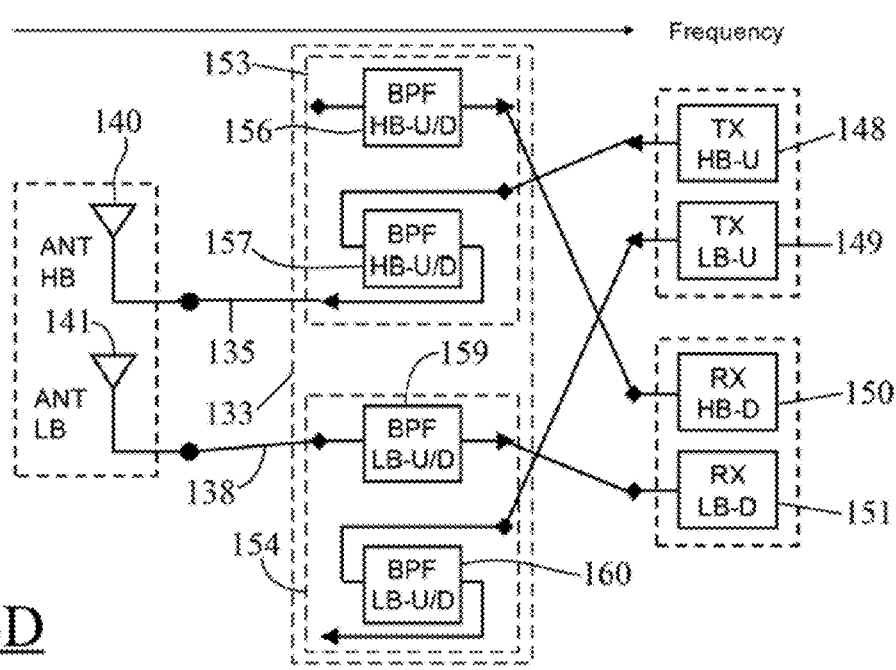
Figure 6E:
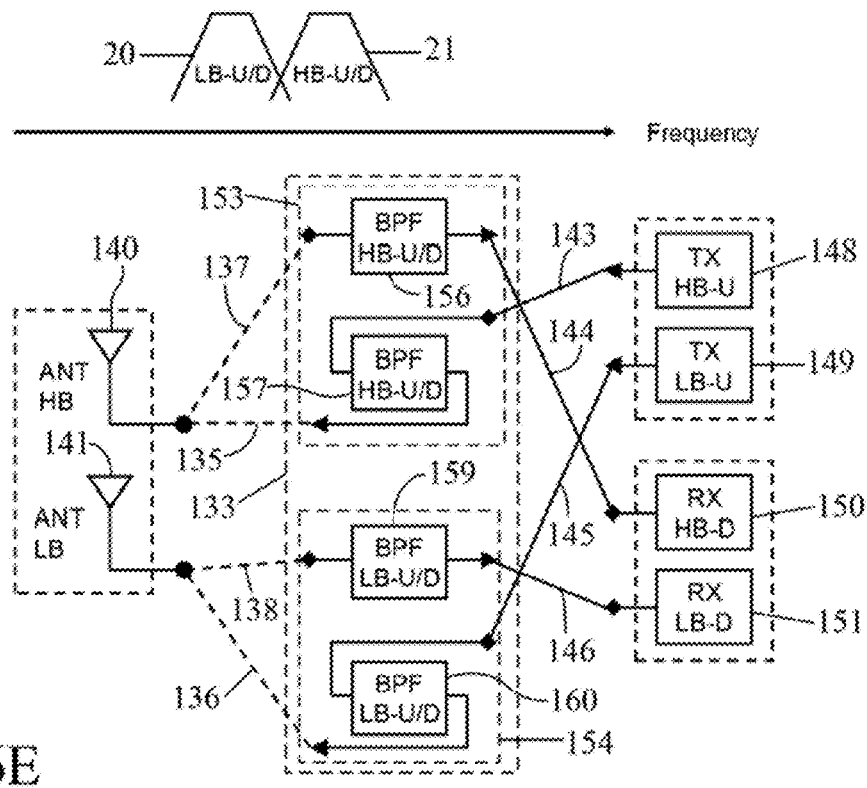
Figure 7:
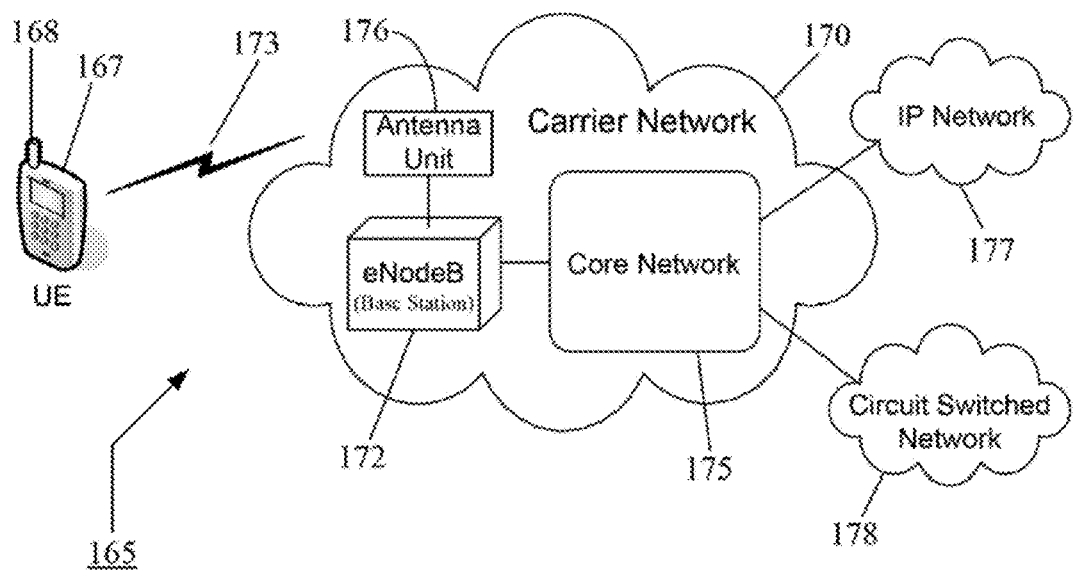
FIG. 7 is a diagram of an exemplary wireless system in which a TDD-CA frontend module according to the teachings of one embodiment of the present invention may be implemented in a mobile handset or a mobile communication node or both.

FIG. 7 is a diagram of an exemplary wireless system 165 in which a TDD-CA frontend module (e.g., the frontend module 185 discussed later with reference to FIGS. 9A-9E) according to the teachings of one embodiment of the present invention may be implemented in a mobile handset (e.g., the mobile handset 167) or a mobile communication node (e.g., the eNodeB 172) or both. As shown, the system 165 may include a mobile handset 167, which may include a corresponding antenna unit 168. To facilitate communication in TDD-CA mode, in one embodiment, the mobile handset 167 may include a frontend module according to the teachings of the present invention (e.g., the frontend module 185 discussed later with, reference to FIGS. 9A-9E) and a transmitter/receiver pair (discussed later with reference to FIGS. 9-10), and the antenna unit 168 may include two or more antennas (not shown individually in FIG. 7, but may be similar to antennas 187-188 shown in FIGS. 9-10), each such antenna can perform transmission and reception in a given frequency band (e.g., HB or LB) of a Component Carrier (CC).

In FIG. 7, the mobile handset 167 is shown to be in wireless communication with a carrier network 170 of a wireless service provider (or operator) through a communication node 172 of the carrier network 170. The communication node 172 may be, for example, a base station in a 3G network, or an evolved Node-B (eNodeB) or Home eNodeB (HeNB) when the carrier network is a Long-Term Evolution (LTE) network, or any other home base station or femtocell, and may provide radio interface to the mobile handset 167. In other embodiments, the communication node 172 may also include a site controller, an access point (AP), or any other type of radio interface device capable of operating in a wireless environment. It is noted here that the terms "mobile handset," "wireless handset," "terminal," and "user equipment (UE)" may be used interchangeably herein to refer to a wireless communication device that is capable of voice and/or data communication via a wireless carrier network. Some examples of such mobile handsets include cellular telephones or data transfer equipments (e.g., a Personal Digital Assistant (PDA) or a pager), smartphones (e.g., iPhone™, Android™, Blackberry™, etc.), computers, Bluetooth® devices, or any other type of user devices capable of operating in a wireless environment. Similarly, the terms "wireless network" or "carrier network" may be used interchangeably herein to refer to a wireless communication network (e.g., a cellular network) facilitating voice and/or data communication between two user equipments (UEs).

In addition to providing air interface (e.g., as represented by a wireless link 173 in FIG. 7) to the UE 167 via an antenna unit 176, the communication node 172 may also perform radio resource management (as, for example, in case of an eNodeB or HeNB in an LTE system) using, for example, channel quality feedbacks received from the UE 167 and other UEs (not shown) operating in the network 170. To facilitate communication in TDD-CA mode, in one embodiment, the eNB 172 may also include a frontend module according to the teachings of the present invention (e.g., the frontend module 185 discussed later with reference to FIGS. 9A-9E) and a transmitter/receiver pair (discussed later with reference to FIGS. 9-10), and the eNB antenna unit 176 may also include two or more antennas (not shown individually in FIG. 7, but may be similar to the antennas 187-188 shown in FIGS. 9-10), each such antenna can perform transmission and reception in a given frequency band (e.g., HB or LB) of a CC. In case of a 3G carrier network 170, the communication node 172 may include functionalities of a 3G base station along with some or all functionalities of a 3G Radio Network Controller (RNC). Communication nodes in other types of carrier networks (e.g., 4G networks and beyond) also may be configured similarly. In one embodiment, the node 172 may be configured (in hardware, via software, or both) to implement the frontend module configuration as discussed herein. For example, switching through frontend module according to one embodiment of the present invention may be implemented through suitable programming of one or more processors (e.g., processor 242 (or, more particularly, processing unit 250) in FIG. 12) in the communication node 172. The execution of the program code (by a processor in the node 172) may cause the processor to implement switching UL and DL subframes as discussed herein. Similarly, the UE 167 may be suitably configured (in hardware and/or software) to implement the frontend module configuration of the present invention. Thus, in the discussion below, although a mobile communication unit—whether the communication node 172 or the UE 167—may be referred to as "performing," "accomplishing," or "carrying out" a function or process, it is evident to one skilled in the art that such performance may be technically accomplished in hardware and/or software as desired.

Although the discussion below is provided primarily in the context of an LTE TDD unit supporting CA, the teachings of the present invention may equally apply, with suitable modifications (as may be apparent to one skilled in the art using the present teachings), to other communication units or devices operating in a number of different wireless systems or networks that use TDD-CA, such as, for example, standard-based systems/networks using 3G/4G specifications or non-standard based systems. Some examples of such systems or networks include, but not limited to, Global System for Mobile communications (GSM) networks, Wideband Code Division Multiple Access (WCDMA) systems, WCDMA-based HSPA systems, CDMA2000, systems, EV-DO systems, WiMAX systems, IMT-Advanced systems, other UTRAN/E-UTRAN networks, GSM/Enhanced Data Rate for GSM Evolution (GSM/EDGE) systems, a non-standard based proprietary corporate wireless network, etc. Also, because the teachings of the present invention may be applied to both Uplink (UL) and Downlink (DL) signals in LTE, the frontend module of the present invention can be implemented in either a base station (e.g., the eNB 172 or a base station/ "super base station" operating in a Coordinated Multi-Point (COMP) transmission and reception arrangement) or a UE (e.g., the UE 167), or both. The teachings of the present invention may also apply to any other non-cellular wireless unit performing TDD-type communication over multiple time slots. Therefore, in the discussion below, the term "wireless communication unit" (or, simply, "communication unit" or "wireless unit") may be used to refer to any of these entities based on the context of discussion—i.e., whether a base station (or wireless access node/access point) or a UE or a wireless transceiver operable in a non-cellular wireless system (e.g., a corporate wireless network, a proprietary walkie-talkie system, etc.).

The carrier network 170 may include a core network 175 coupled to the communication node 172 and providing logical and control functions (e.g., subscriber account management, billing, subscriber mobility management, etc.) in the network 170. In case of an LTE carrier network, the core network 175 may be an Access Gateway (AGW). Regardless of the type of carrier network 170, the core network 175 may function to provide connection of the UE 167 to other mobile handsets operating in the carrier network 170 and also to other communication devices (e.g., wireline or wireless phones) or resources (e.g., an Internet website) in other voice and/or data networks external to the carrier network 170. In that regard, the core network 170 may be coupled to a packet-switched network 177 (e.g., an Internet Protocol (IP) network such as the Internet) as well as a circuit-switched network 178 such as the Public-Switched Telephone Network (PSTN) to accomplish the desired connections beyond the devices operating in the carrier network 170. Thus, through the communication node's 172 connection to the core network 175 and the handset's 167 radio link with the communication node 172, a user of the handset 167 may wirelessly (and seamlessly) access many different resources or systems beyond those operating within the carrier network 170 of an operator.

As is understood, the carrier network 170 may be a cellular telephone network or a Public Land Mobile Network (PLMN) in which the UE 167 may be a subscriber unit. However, as mentioned before, the present invention is operable in other non-cellular wireless networks as well (whether voice networks, data networks, or both). Furthermore, portions of the carrier network 170 may include, independently or in combination, any of the present or future wireline or wireless communication networks such as, for example, the PSTN, or a satellite-based communication link. Similarly, as also mentioned above, the carrier network 170 may be connected to the Internet via its core network's 175 connection to the IP (packet-switched) network 177 or may include a portion of the Internet as part thereof.

Figure 8:
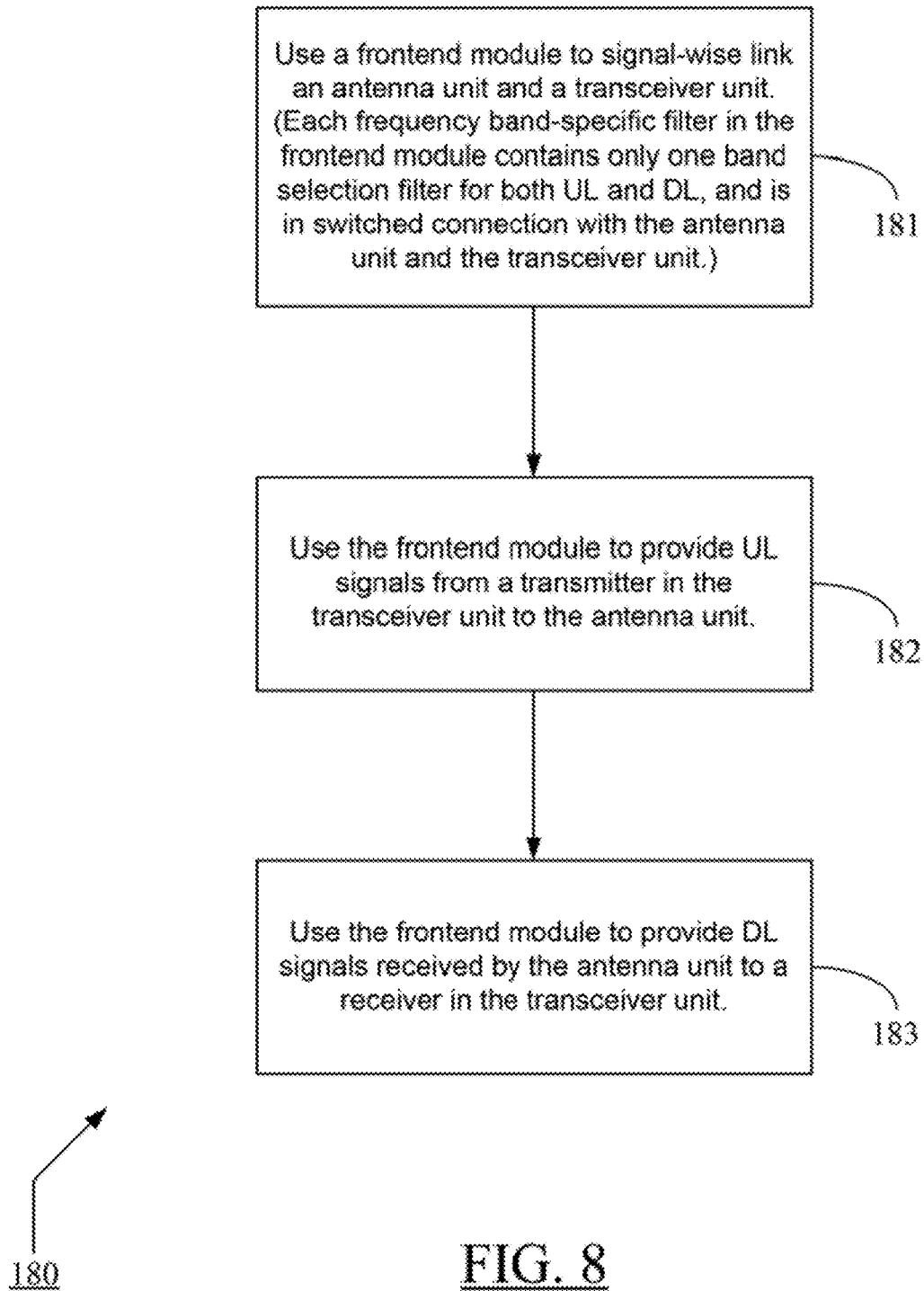
FIG. 8 depicts an exemplary flowchart showing how a frontend module according to one embodiment of the present invention may be implemented in a wireless communication unit.

FIG. 8 depicts an exemplary flowchart 180 showing how a frontend module (e.g., the frontend module 185 discussed later below with reference to FIGS. 9-10) according to one embodiment of the present invention may be implemented in a wireless communication unit (e.g., the UE 167 and/or the eNB 172 as mentioned earlier). The frontend module according to the teachings of the present invention may signal-wise link an antenna unit with a transceiver unit (which may include a separate transmitter and a separate receiver as discussed below) in the communication unit (block 181, FIG. 8). Although the frontend module of the present invention is discussed in more detail later with reference to FIGS. 9-10, it is noted here at block 181 in FIG. 8 that each frequency band-specific filter in such a frontend module may contain only one band selection filter that can be used for both UL and DL signals over a corresponding frequency band. Such a single filter-based implementation may be possible when the frontend module is in switched connection with both the antenna unit and the transceiver unit (as opposed to frontend modules in FIGS. 5 and 6 containing switches on only one side thereof—i.e., either on the antenna side or on the transmitter/receiver side, but not on both sides). Thus, the frontend module of the present invention may continue to provide the "typical" functionality of a frontend module—i.e., to be a conduit of transmitted and received signals to/from the antenna unit from/to the transmitter/receiver units (blocks 182-183 in FIG. 8) with proper band selection and isolation for multimode and multi-band communication, but with only a single BPF for both UL and DL signals over a given TDD-CA band.

FIGS. 9A-9E illustrate a frontend module 185 for TDD-CA according to one embodiment of the present invention in which switches are introduced on both the antenna side and the transmitter/receiver side of the frontend module. As mentioned before with reference to discussion of FIGS. 5-6, only two carriers (CC's) are assumed for CA throughout the present discussion, and, corresponding spectrum allocation (i.e., LB and HB frequency bands 20-21 and related UL/DL signaling in each band) for TDD-CA is also shown at the top in each of FIGS. 9 and 10. It is noted, however, that the two-carrier implementation in FIGS. 9-10 is exemplary only; the frontend module configuration according to one embodiment the present invention may be suitably modified to be applicable to TDD-CA schemes having any number of CCs. As shown in FIGS. 9A-9E, the frontend module 185 signal-wise connects (via appropriate switched connections as discussed later below) two band-specific antennas 187-188 with corresponding band-specific transmitters 190-191 and band-specific receivers 193-194. In one embodiment, the antennas 187-188 (or the wideband antenna 220 in FIGS. 10, if such implementation is chosen) may be part of an antenna unit (e.g., the antenna unit 168 or the antenna unit 176 in FIG. 7) in a wireless communication unit. Similarly, all of the transmitters 190-191 and receivers 193-194 may be part of a transceiver unit (e.g., the transceiver unit 235 in FIG. 11, or a transceiver unit 246 in FIG. 12). In case of FIG. 9A, it is assumed that both the LB 20 and the HB 21 are allocated for UL. In that case, the antenna-side switched connections of the frontend module 185 are represented by lines 196-197 and the transmitter/receiver side switched connections are represented by lines 201-202. Overall, FIGS. 9A-9D represent different switching arrangements via lines 196-199 (on the antenna side) and 201-204 (on the transmitter/receiver side). It is emphasized here that lines 196-199 and 201-204 in various figures in FIGS. 9A-9D illustrate switched connections only—i.e., these lines are used merely to illustrate different signal switching arrangements in FIGS. 9A-9D and they do not depict any hardwired connections.

Figure 9A:
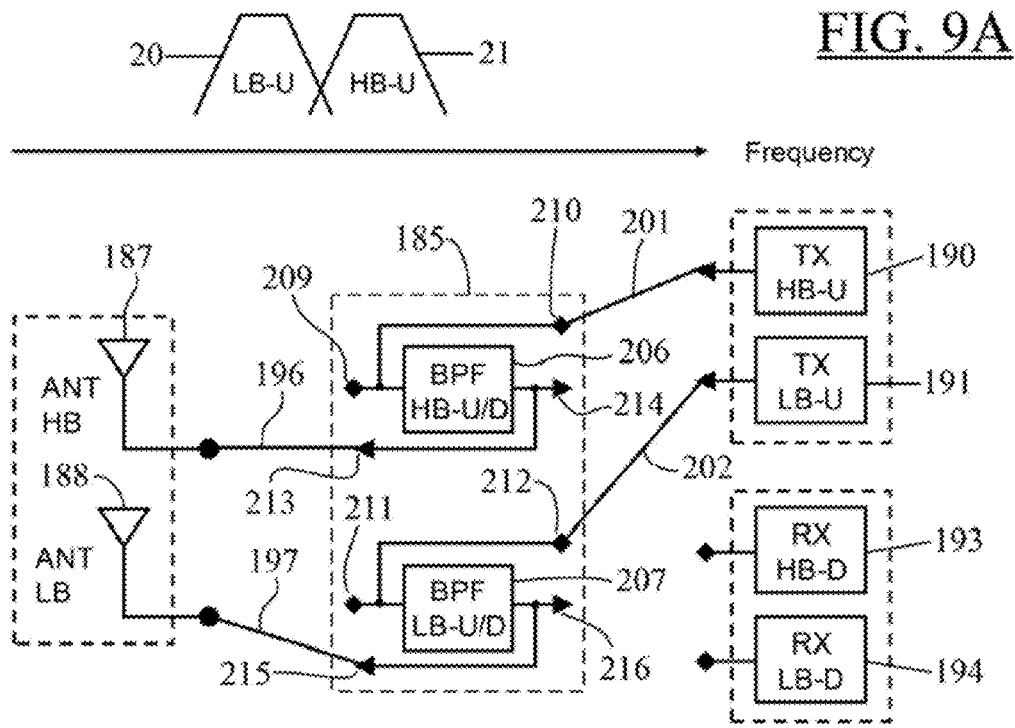
FIGS. 9A-9E illustrate a frontend module for TDD-CA according to one embodiment of the present invention in which switches are introduced on both the antenna side and the transmitter/receiver side of the frontend module.

As shown in FIG. 9A, the frontend module 185 requires only two band selection filters 206, 207 (i.e., only one BPF for each band and usable for both UL and DL signaling) for the same spectrum allocation and UL/DL configurations considered earlier in FIGS. 5-6. In other words, in the frontend module 185, the BPF 206 is reused for both UL and DL signals in the HB and the BPF 207 is reused for UL/DL signals in the LB, thereby reducing the number of required filters to just one filter per frequency band. As shown in FIG. 9A, each band-specific filter 206, 207 includes two input ports 209-210 and 211-212, respectively, and two output ports 213-214 and 215-216, respectively. It is noted that each such port is labeled in FIG. 9A only (and not in any of the other figures in FIGS. 9-10) for the sake of clarity and to avoid undue repetition in other figures. When both HB and LB are used for UL as in FIG. 9A, the outputs 213, 215 of the two filters 206, 207, respectively, may be connected to the corresponding band-specific antennas 187-188 (as represented by switched connections 196-197), while the inputs 210, 212 of these two filters may be connected to corresponding outputs of the two band-specific transmitters 190-191 (as shown using switched connections 201-202).

Figure 9B:
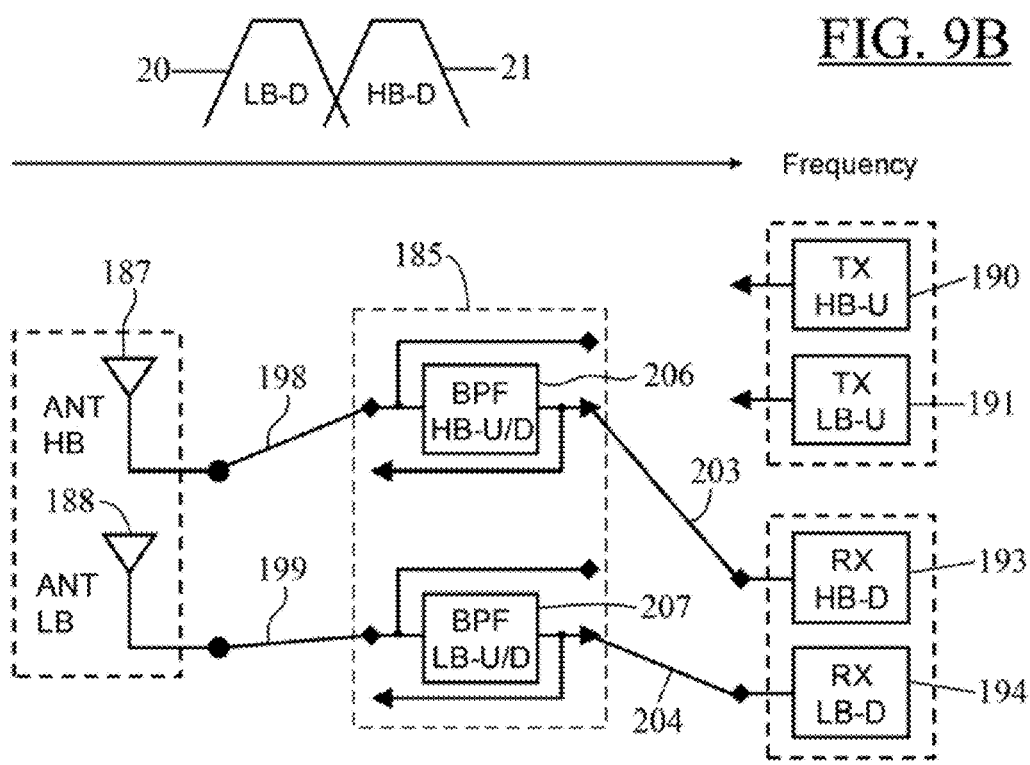
Figure 9C:
Figure 9C:
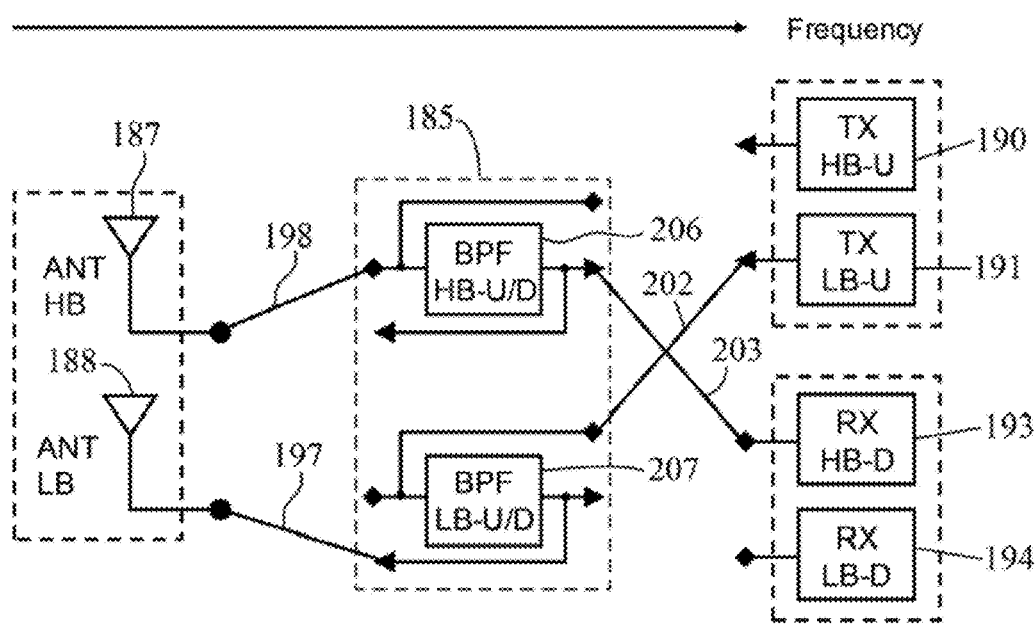
Figure 9D:
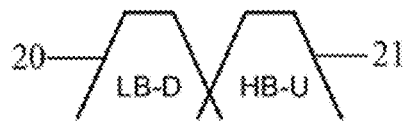
Figure 9D:
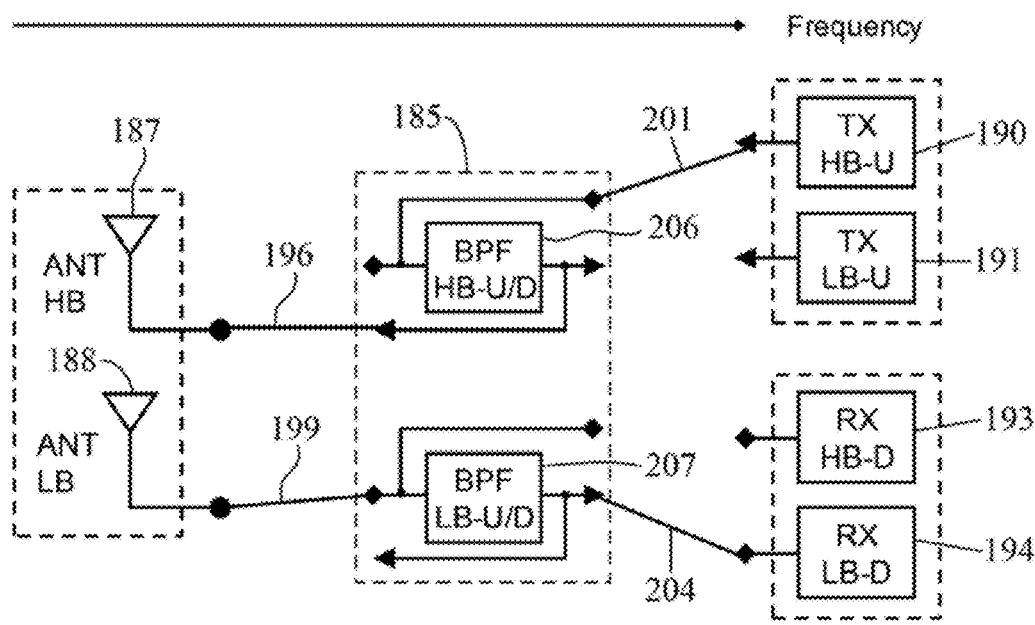

When both the LB 20 and the HB 21 are used for DL as in case of FIG. 9B, the inputs of the two filters 206-207 may be connected to the corresponding antennas 187-188 (via switched connections 198-199) while the outputs of the filters 206-207 may be connected to the corresponding inputs of the two band-specific receivers 193-194 (via switched connections 203-204) as shown in FIG. 9B. When the LB 20 and the HB 21 are allocated for UL and DL, respectively, as in FIG. 9C, the LB filter 207 may deliver a UL signal from the corresponding LB-specific UL transmitter 191 to the LB-specific antenna 188 (as represented by switched connections 202 and 197 in FIG. 9C), while the HB filter 206 may deliver a DL signal from the HB-specific antenna 187 to the HB-specific DL receiver 193 (as represented by switched connections 198 and 203 in FIG. 9C). Finally, when the LB and the HB are allocated for DL and UL, respectively, as in FIG. 9D, the LB filter 207 may deliver a DL signal from the LB-specific antenna 188 to the LB-specific DL receiver 194 (as represented by switched connections 199 and 204 in FIG. 9D), while the HB filter 206 may deliver a UL signal from the HB-specific UL transmitter 190 to the HB-specific antenna 187 (as represented by switched connections 201 and 196 in FIG. 9D).

Figure 9E:
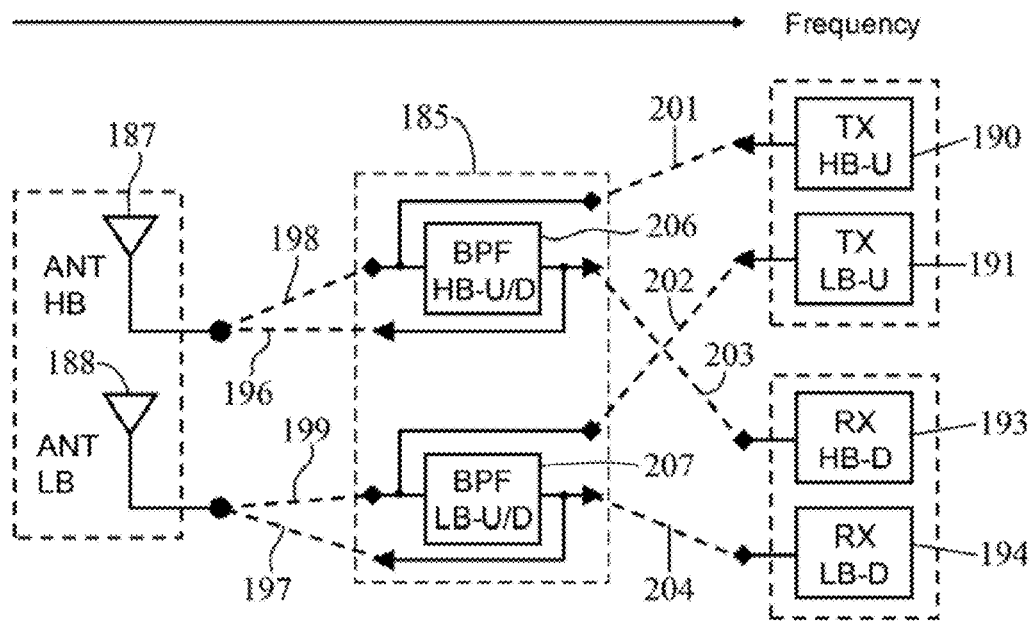
Figure 10A:
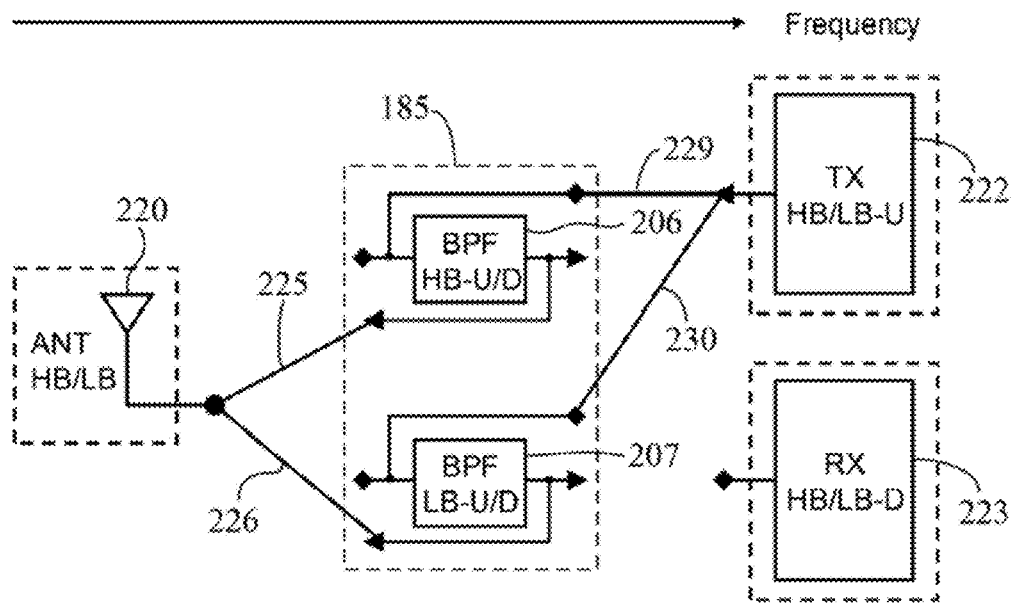
Figure 10D:
Figure 10D:
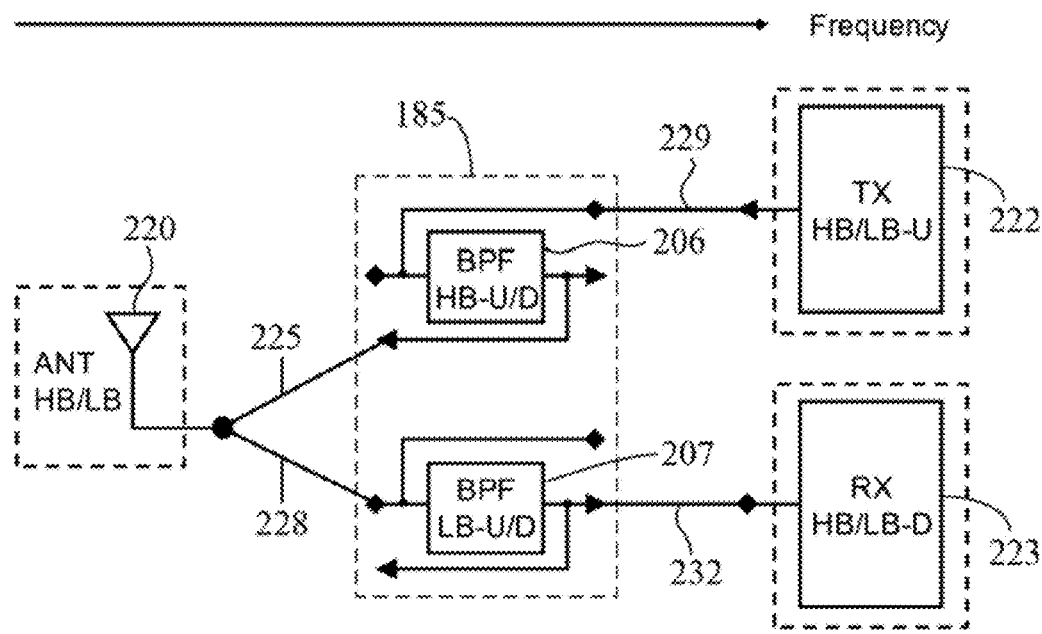
Figure 10E:
Figure 10E:
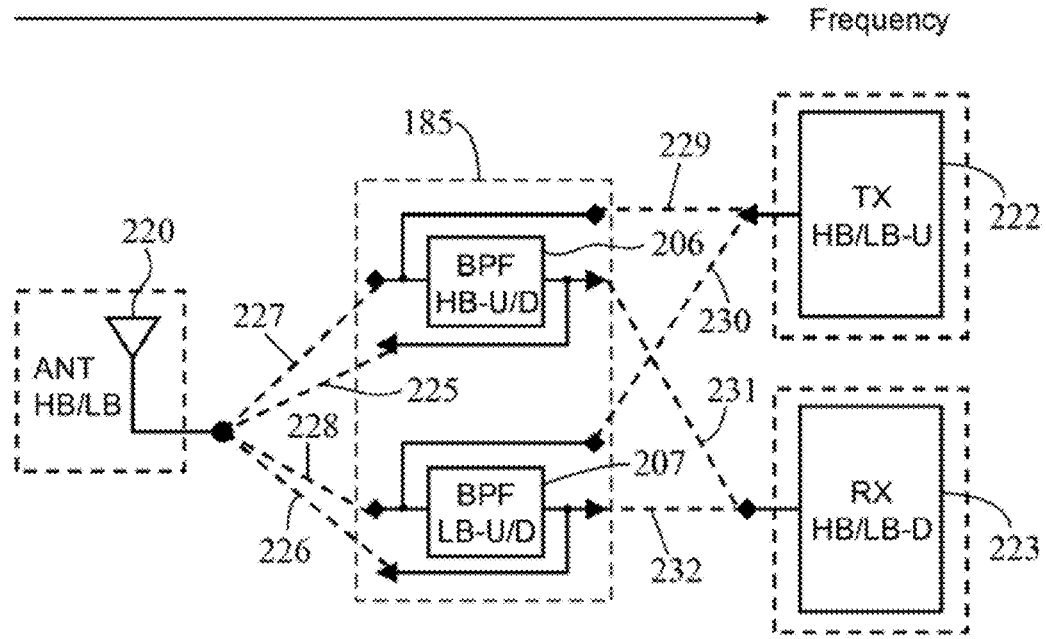

All individual switching possibilities shown in FIGS. 9A-9D are depicted combined in FIG. 9E, in which dashed lines 196-199 and 201-204 are used for various switched connections already shown in FIGS. 9A-9D. As mentioned earlier, the transmitter/receiver blocks and antennas are shown in FIGS. 9A-9E surrounded by dashed lines to indicate that these components can be optionally integrated into a single multiband (or wideband) component (e.g., when the frequency difference between the HB and LB is small enough) as shown, for example, in FIGS. 10A-10E.

FIGS. 10A-10E show the frontend module 185 of FIGS. 9A-9E used with a wideband antenna 220 and a wideband transmitter/receiver pair 222-223. Except for the use of multiband (or wideband) components 220, 222, and 223, the frontend module configurations in FIGS. 10A-10E are substantially similar to those in FIGS. 9A-9E, respectively. Therefore, a more detailed discussion of various switching arrangements in FIGS. 10A-10E, constructional details of the frontend module 185, various filter ports in the frontend module 185, etc., is not repeated herein for the sake of brevity. However, for ease of reference and to distinguish the frontend module's 185 switched connections in the context of wideband components (whether antenna and/or transmitter/receiver) in FIGS. 10A-10E from those connections in the context of band-specific components in FIGS. 9A-9E, various antenna-side switched connections in FIGS. 10A-10E are identified with reference numerals 225-228 and various transmitter/receiver side switched connections are identified with reference numerals 229-232. Like FIG. 9E, all individual switching possibilities shown in FIGS. 10A-10D are depicted combined in FIG. 10E, in which dashed lines 225-232 are used for various switched connections already shown in FIGS. 10A-10D. As in case of the embodiment in FIGS. 9A-9E, the switches on both the antenna side and the transmitter/receiver side in the embodiment of FIGS. 10A-10E (as represented by switched connections 225-232) enable the reuse of the band selection filters (i.e., BPFs 206-207 in the frontend module 185) according to the UL/DL configuration (shown by way of an example at the top of each of the FIGS. 10A-10E) of the current LTE radio subframe.

From the discussion of FIGS. 9-10, it is seen that because of switches on the antenna side, the antenna can be switched between the inputs and outputs of the same BPF in the frontend module 185. Similarly, because of the switches on the transmitter/receiver side as well, the transmitters/receivers also can be switched between the inputs and outputs of the same BPF in the frontend module 185. In other words, as mentioned before, the switches on both the antenna side and the transmitter/receiver side enable the reuse of the band selection filters according to the UL/DL configuration of the LTE radio subframe. Such reuse (and resulting reduction in the total number of band selection filters in a frontend module) may not be possible in the embodiments of FIGS. 5-6 where only one side of the frontend module has the switches.

It is noted here that, in one embodiment, the term "transmitter" (whether as applied to the band-specific transmitters 190-191 in FIGS. 9A-9E or to the wideband transmitter 222 in FIGS. 10A-10E) may include not only an RF IC having transmitter functionality, but also a power amplifier (not shown) used in conjunction with an RF transmitter in a wireless communication unit.

Figure 11:
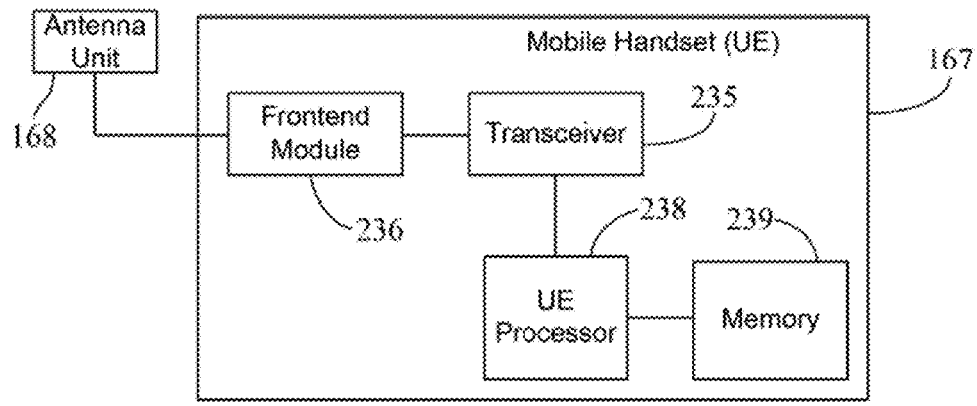
FIG. 11 is a block diagram of an exemplary mobile handset or UE according to one embodiment of the present invention.

FIG. 11 is a block diagram of an exemplary mobile handset or UE (e.g., the UE 167 shown in FIG. 7) according to one embodiment of the present invention. The UE 167 may include a transceiver 235, an antenna unit 168, a frontend module 236 placed between the antenna unit 168 and the transceiver 235, a processor 238 coupled to the transceiver 235, and a memory 239 (which may, in some embodiments, also include memory on UE's Subscriber Identity Module (SIM) card) coupled to the processor 238. In case of carrier aggregation (CA) with two CCs, the frontend module 236 may have configuration similar to the frontend module 185 shown in FIGS. 9-10. Similarly, in case of two CC-based CA, the antenna unit 168 may either include two band-specific antennas (like antennas 187-188 in FIG. 9) or a single wideband antenna (like antenna 220 in FIG. 10), and the transceiver unit 235 may either include band-specific transmitters/receivers (like transmitters 190-191 and receivers 193-194 in FIG. 9) or a wideband transmitter/receiver pair (e.g., transmitter 222 and receiver 223 in FIG. 10). For other CC configurations, the frontend module 236 may be suitably designed as per teachings of the present invention. Also, in another embodiment, there may be a combination of band-specific and multi-band (wideband) components (e.g., the antenna unit 168 may include a wideband antenna whereas the transceiver 235 may include band-specific transmitters/receivers, etc.) as per desired implementation. In particular embodiments, some or all of the functionalities described above with reference to FIGS. 8-10 (e.g., connection of appropriate switches of the frontend module 236 to the antenna unit 168 and the transceiver 235 as per the current UL/DL configuration, etc.) as being provided by a mobile communication unit (e.g., a mobile handset, device, or other forms of UE) may be provided by the UE processor 238 executing instructions stored on a computer-readable medium, such as the memory 239 shown in FIG. 11. Alternative embodiments of the UE 167 may include additional components beyond those shown in FIG. 11 that may be responsible for enabling the UE's 167 communication with the base station 172 in the network 170 and for providing certain aspects of the UE's functionality, including any of the functionality described above and/or any functionality necessary to support the solution described above.

Figure 12:
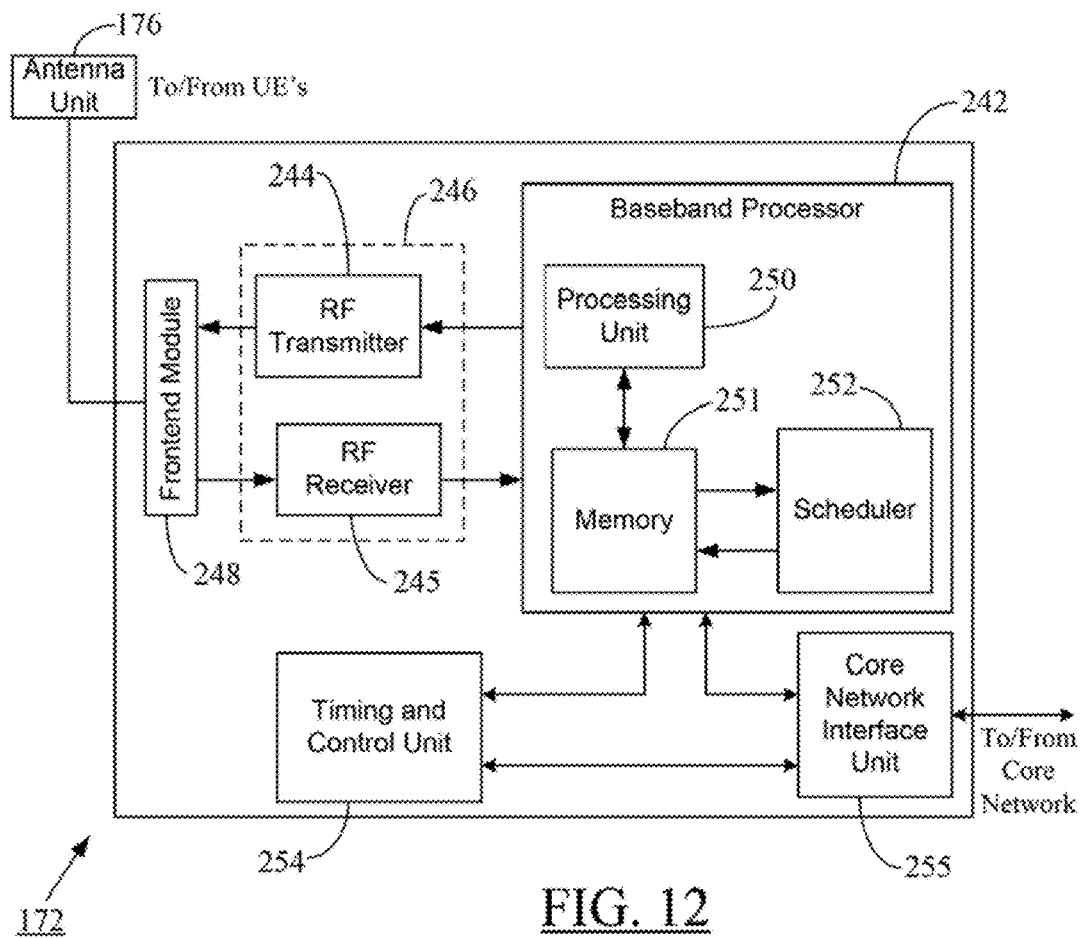
FIG. 12 is a block diagram of an exemplary eNB or a similar mobile communication node (or base station) according to one embodiment of the present invention.

FIG. 12 is a block diagram of an exemplary eNB or a similar mobile communication node (or base station) (e.g., the eNB 172 in FIG. 7) according to one embodiment of the present invention. The eNB 172 may include a baseband processor 242 to provide radio interface with the mobile handsets (in the carrier network 170) via eNB's Radio Frequency (RF) transmitter 244 and RF receiver 245 units coupled to the eNB antenna unit 176. In one embodiment, the transmitter 244 and receiver 245 may form part of a transceiver unit identified by a dashed block 246. The eNB 172 may also include a frontend module 248 placed between its antenna unit 176 and transceiver unit 246. In case of carrier aggregation (CA) with two CCs, the frontend module 248 may have configuration similar to the frontend module 185 shown in FIGS. 9-10. Similarly, in case of two CC-based CA, the antenna unit 176 may either include two band-specific antennas (like antennas 187-188 in FIG. 9) or a single wideband antenna (like antenna 220 in FIG. 10), and the transceiver unit 246 may either include band-specific transmitters/receivers (like transmitters 190-191 in FIG. 9 forming the RF transmitter unit 244 and receivers 193-194 in FIG. 9 forming the RF receiver unit 245) or a wideband transmitter/receiver pair (e.g., transmitter 222 in FIG. 10 as the RF transmitter 244 and receiver 223 in FIG. 10 as the RF receiver 245). For other CC configurations, the frontend module 248 may be suitably designed as per teachings of the present invention. Also, in another embodiment, there may be a combination of band-specific and multi-band (wideband) components (e.g., the antenna unit 176 may include a wideband antenna whereas the transceiver 246 may include band-specific transmitters/receivers, etc.) as per desired implementation.

The baseband processor 242 may include a processing unit 250 in communication with a memory 251 to process and store relevant information for the cell. The processing unit 250 may be configured (in hardware and/or software) to enable eNB 172 to perform radio communication with the mobile handsets (in the carrier network 170). In particular embodiments, some or all of the functionalities described above with reference to FIGS. 8-10 (e.g., connection of appropriate switches of the frontend module 248 to the antenna unit 176 and the transceiver 246 as per the current UL/DL configuration, etc.) as being provided by a mobile communication unit (e.g., a mobile communication node or base station) may be provided by the processing unit 250 executing instructions stored on a computer-readable medium, such as the memory 251 shown in FIG. 12. A scheduler (e.g., the scheduler 252 in FIG. 12) in the eNB 172 may provide the scheduling decision for UE 167 based on a number of factors such as, for example, QoS (Quality of Service) parameters, UE buffer status, uplink channel quality report received from UE 167, UE capabilities, etc. The scheduler 252 may have the same data structure as a typical scheduler in an eNB in an LTE system.

The processor 242 may also provide additional baseband signal processing (e.g., mobile device registration, channel signal information transmission, radio resource management, etc.) as required. The processing unit 250 may include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Some or all of the functionalities described above as being provided by a mobile base station, a base station controller, a node B, an enhanced node B, an HeNB, a home base station, a femtocell base station, and/or any other type of mobile communications node may be provided by the processing unit 250 executing instructions stored on a computer-readable data storage medium, such as the memory 251 shown in FIG. 12.

The eNB 172 may further include a timing and control unit 254 and a core network interface unit 255 as illustrated in FIG. 12. The control unit 254 may monitor operations of the processor 242 and the network interface unit 255, and may provide appropriate timing and control signals to these units. The interface unit 255 may provide a bi-directional interface for the eNB 172 to communicate with the core network 255 to facilitate administrative and call-management functions for mobile subscribers operating in the carrier network 170 through eNB 172.

Alternative embodiments of the base station 172 may include additional components responsible for providing additional functionality, including any of the functionality identified above and/or any functionality necessary to support the solution described above. Although features and elements are described above in particular combinations, each feature or element can be used alone without the other features and elements or in various combinations with or without other features and elements. At least a portion of the methodology provided herein (e.g., related to switching configuration of a frontend module) may be implemented in a computer program, software, or firmware incorporated in a computer-readable storage medium (e.g., the memory 251 in FIG. 12) for execution by a general purpose computer or a processor (e.g., the processing unit 250 in FIG. 12). Examples of computer-readable storage media include a Read Only Memory (ROM), a Random Access Memory (RAM), a digital register, a cache memory, semiconductor memory devices, magnetic media such as internal hard disks, magnetic tapes and removable disks, magneto-optical media, and optical media such as CD-ROM disks and Digital Versatile Disks (DVDs).

The foregoing describes a frontend module for TDD-CA, wherein the frontend module reuses the band selection filters for the aggregated bands and provides switched connections to antenna and transmitter/receiver according to the UUDL configuration. The use of switches on both the antenna side and the transmitter/receiver side of the frontend module enables the reuse of the band selection filters. The frontend module according to the present invention reduces the number of required filters to only one filter for each TDD-CA Component Carrier (CC) band. Thus, the frontend module avoids unnecessary band selection filters, and thereby also controls the cost of implementation of frontend modules in wireless units operating in the TDD-CA mode.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A wireless communication unit operable in a wireless network in Time Division Duplex-Carrier Aggregation (TDD-CA) mode, wherein the wireless network supports TDD communication over a plurality of frequency bands aggregated for the CA, and wherein the wireless communication unit comprises:

an antenna unit;

a transceiver unit; and a frontend module to signal-wise link the antenna unit and the transceiver unit, wherein the frontend module includes a plurality of frequency band-specific filters in which each band-specific filter contains only one band selection filter usable for both Uplink (UL) and Downlink (DL) signals over a corresponding frequency band from the plurality of frequency bands, and wherein each band-specific filter is in switched connection with the antenna unit and the transceiver unit;

wherein the transceiver unit includes:

a plurality of frequency band-specific transmitters, wherein each band-specific transmitter is in switched connection with only one band-specific filter corresponding thereto from the plurality of band-specific filters and is configured to perform transmissions of UL signals over a first respective frequency band from the plurality of frequency bands; and a plurality of frequency band-specific receivers, wherein each band-specific receiver is in switched connection with only one band-specific filter corresponding thereto from the plurality of band-specific filters and is configured to perform receptions of DL signals over a second respective frequency band from the plurality of frequency bands.

2. The wireless communication unit of claim 1, wherein the antenna unit includes a plurality of frequency band-specific antennas corresponding to the plurality of frequency bands, and wherein each band-specific antenna is in switched connection with only one band-specific filter corresponding thereto from the plurality of band-specific filters.

3. The wireless communication unit of claim 1, wherein the antenna unit includes a single wideband antenna supporting communication over all frequency bands in the plurality of frequency bands.

4. The wireless communication unit of claim 1, wherein each frequency band-specific filter comprises:

a first input port facilitating switched connection of the selection filter to a transmitter portion in the transceiver unit;

a second input port facilitating switched connection of the selection filter to the antenna unit;

a first output port facilitating switched connection of the selection filter to the antenna unit; and a second output port facilitating switched connection of the selection filter to a receiver portion in the transceiver unit.

5. A wireless communication unit operable in a wireless network in Time Division Duplex-Carrier Aggregation (TDD-CA) mode, wherein the wireless network supports TDD communication over a plurality of frequency bands aggregated for the CA, and wherein the wireless communication unit comprises:

an antenna unit;

a transceiver unit; and a frontend module to signal-wise link the antenna unit and the transceiver unit, wherein the frontend module includes a plurality of frequency band-specific filters in which each band-specific filter contains only one band selection filter usable for both Uplink (UL) and Downlink (DL) signals over a corresponding frequency band from the plurality of frequency bands, and wherein each band-specific filter is in switched connection with the antenna unit and the transceiver unit;

wherein the transceiver unit includes:

a single wideband transmitter in switched connection with all band-specific filters in the plurality of band-specific filters and supporting transmissions of UL signals over all frequency bands in the plurality of frequency bands; and a single wideband receiver in switched connection with all band-specific filters in the plurality of band-specific filters and supporting receptions of DL signals over all frequency bands in the plurality of frequency bands.

6. A method of facilitating wireless communication in Time Division Duplex-Carrier Aggregation (TDD-CA) mode in a wireless network, wherein the wireless network supports TDD communication over a plurality of frequency bands aggregated for the CA, and wherein the method comprises the steps of:

using a frontend module to signal-wise link an antenna unit and a transceiver unit, wherein the frontend module includes a plurality of frequency band-specific filters in which each band-specific filter contains only one band selection filter usable for both Uplink (UL) and Downlink (DL) signals over a corresponding frequency band from the plurality of frequency bands, and wherein each band-specific filter is in switched connection with the antenna unit and the transceiver unit, wherein the transceiver unit includes:

a single wideband transmitter in switched connection with all band-specific filters in the plurality of band-specific filters and supporting transmissions of UL signals over all frequency bands in the plurality of frequency bands; and a single wideband receiver in switched connection with all band-specific filters in the plurality of band-specific filters and supporting receptions of DL signals over all frequency bands in the plurality of frequency bands;

using the frontend module, providing UL signals from a transmitter in the transceiver unit to the antenna unit; and using the frontend module, providing DL signals received by the antenna unit to a receiver in the transceiver unit.

7. A method of facilitating wireless communication in Time Division Duplex-Carrier Aggregation (TDD-CA) mode in a wireless network, wherein the wireless network supports TDD communication over a plurality of frequency bands aggregated for the CA, and wherein the method comprises the steps of:

using a frontend module to signal-wise link an antenna unit and a transceiver unit, wherein the frontend module includes a plurality of frequency band-specific filters in which each band-specific filter contains only one band selection filter usable for both Uplink (UL) and Downlink (DL) signals over a corresponding frequency band from the plurality of frequency bands, and wherein each band-specific filter is in switched connection with the antenna unit and the transceiver unit, wherein the transceiver unit includes:

a plurality of frequency band-specific transmitters, wherein each band-specific transmitter is in switched connection with only one band-specific filter corresponding thereto from the plurality of band-specific filters and is configured to perform transmissions of UL signals over a first respective frequency band from the plurality of frequency bands, and a plurality of frequency band-specific receivers, wherein each band-specific receiver is in switched connection with only one band-specific filter corresponding thereto from the plurality of band-specific filters and is configured to perform receptions of DL signals over a second respective frequency band from the plurality of frequency bands;

using the frontend module, providing UL signals from a transmitter in the transceiver unit to the antenna unit; and using the frontend module, providing DL signals received by the antenna unit to a receiver in the transceiver unit.

8. The method of claim 7, wherein the antenna unit includes:

a single wideband antenna supporting communication over all frequency bands in the plurality of frequency bands.

9. The method of claim 7, wherein each frequency band-specific filter comprises:

a first input port facilitating switched connection of the selection filter to a transmitter portion in the transceiver unit;

a second input port facilitating switched connection of the selection filter to the antenna unit;

a first output port facilitating switched connection of the selection filter to the antenna unit; and a second output port facilitating switched connection of the selection filter to a receiver portion in the transceiver unit.

10. The method of claim 7, wherein the antenna unit includes:

a plurality of frequency band-specific antennas corresponding to the plurality of frequency bands, and wherein each band-specific antenna is in switched connection with only one band-specific filter corresponding thereto from the plurality of band-specific filters.

* * * * *